(12) United States Patent
Kuma

(10) Patent No.: US 6,937,985 B2
(45) Date of Patent: Aug. 30, 2005

(54) PORTABLE TERMINAL APPARATUS AND RELATED INFORMATION MANAGEMENT SYSTEM AND METHOD WITH CONCURRENT POSITION DETECTION AND INFORMATION COLLECTION

(75) Inventor: Tatsuya Kuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,064

(22) Filed: Mar. 9, 1998

(65) Prior Publication Data

US 2002/0004752 A1 Jan. 10, 2002

(30) Foreign Application Priority Data

Oct. 14, 1997 (JP) .............................................. 9-280763

(51) Int. Cl.⁷ ................................................ H04B 1/38
(52) U.S. Cl. ...................... 704/275; 709/227; 704/275; 375/356; 701/213; 455/403
(58) Field of Search ...................... 705/28, 22; 701/213, 701/207; 375/356; 340/825.35; 700/115, 215; 704/275, 244, 251, 258; 455/403, 186.1; 709/224, 223, 227

(56) References Cited

U.S. PATENT DOCUMENTS

| | | | |
|---|---|---|---|
| 5,166,499 A | * 11/1992 | Holland et al. ............. 235/376 |
| 5,406,491 A | 4/1995 | Lima | |
| 5,412,738 A | * 5/1995 | Brunelli et al. ............. 382/115 |
| 5,563,607 A | * 10/1996 | Loomis et al. ............. 342/357 |
| 5,699,244 A | * 12/1997 | Clark, Jr. et al. ............... 702/2 |
| 5,712,899 A | * 1/1998 | Pace, II ........................ 379/58 |
| 5,726,660 A | * 3/1998 | Purdy et al. ................. 342/357 |
| 5,794,204 A | * 8/1998 | Miyazawa et al. .......... 704/275 |
| 5,850,618 A | * 12/1998 | Suetsugu et al. ........... 701/210 |
| 5,919,239 A | * 7/1999 | Franker et al. ............... 701/35 |
| 5,933,478 A | * 8/1999 | Ozaki et al. ............. 379/93.24 |
| 5,970,143 A | * 10/1999 | Schneier et al. .............. 380/23 |

FOREIGN PATENT DOCUMENTS

| | | |
|---|---|---|
| EP | 0650071 A1 | 4/1995 |
| EP | 0 768 638 A2 | 4/1997 |
| GB | 2249202 A | 4/1992 |
| JP | 6-103498 | 4/1994 |
| JP | 6-229769 | 8/1994 |
| JP | 6-259445 | 9/1994 |
| JP | 8-218732 | 8/1996 |
| JP | 08273097 A | 10/1996 |
| JP | 8-273097 | 10/1996 |
| JP | 09050600 | * 2/1997 |
| JP | 09050600 A | 2/1997 |
| JP | 09058819 A | 3/1997 |
| JP | 9-119848 | 5/1997 |
| JP | 09204480 A | 8/1997 |
| JP | 09210699 A | 8/1997 |
| JP | 9-242976 | 9/1997 |

OTHER PUBLICATIONS

INSPEC abstract No. B9601–6250G–038 & Proc. AM/FM conf. XVIII pp. 1151–1158: KP Whistler: GPS/GIS Mapping in the Telecommunications Industry.

* cited by examiner

*Primary Examiner*—Pierre E. Elisca
(74) *Attorney, Agent, or Firm*—Staas & Halsey LLP

(57) ABSTRACT

An information collecting portion collects predetermined information. A position detecting portion detects the position of a portable terminal device at the present time. A managing portion manages the predetermined information collected by the information collecting portion and the information of the position, detected by the position detecting portion when the information collecting portion collects the predetermined information, together.

37 Claims, 24 Drawing Sheets

| D 1 | D 2 |
|---|---|
| D 1 − 1 | D 2 − 1 |
| ⋮ | ⋮ |
| D 1 − n | D 2 − n |

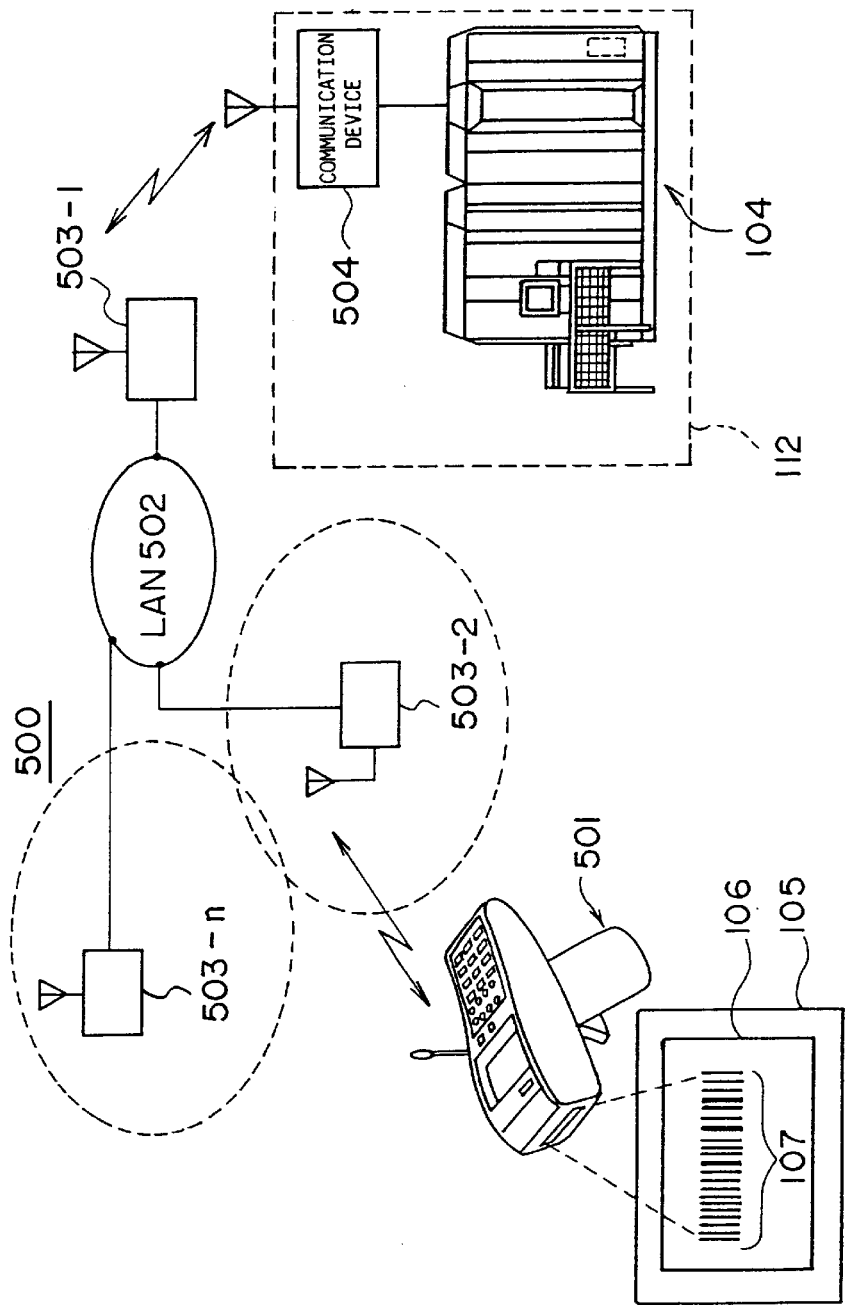

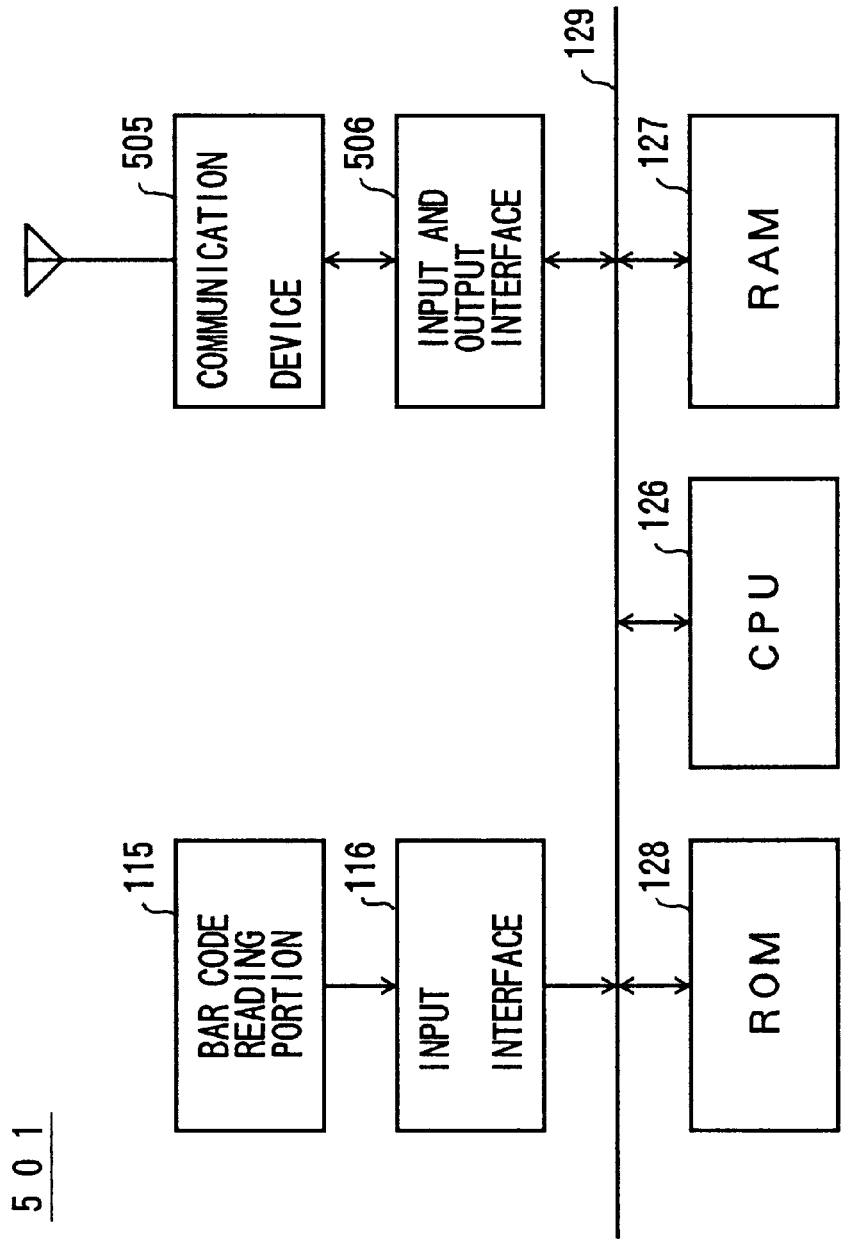

PORTABLE TERMINAL APPARATUS AND RELATED INFORMATION MANAGEMENT SYSTEM AND METHOD WITH CONCURRENT POSITION DETECTION AND INFORMATION COLLECTION

BACKGROUND OF THE INVENTION

1. Field of the Invention

The present invention relates to a portable terminal device, and an information management system and an information management method using the portable terminal device, and, in particular, to a portable terminal device, and an information management system and an information management method using the portable terminal device, for managing information together with information of a position at which the information was obtained.

Recently, with development of distribution of articles, it has been important to manage articles. At the present time, there is a system using bar codes as a general system for managing articles in distribution.

In such a system, a bar code is previously printed on a slip provided on each article, and then, when the article is collected, the bar code printed on the slip provided on the article is read through a handy bar-code reader and is then stored. The stored bar code is then stored in a host computer of a management center, and thus, distribution of articles is managed.

In order to accurately manage distribution of articles, it is necessary to manage the position and the time at which each bar code was read.

2. Description of the Related Art

In an article distribution system in the related art, an operator inputs the position and the time, at which each bar code is read, through key operations or through a bar code table.

However, in the related art, the bar code of a collected article indicating identification of the article is read through the bar code reader, and similarly, the bar code for the present position is read from a position information bar code table. Otherwise, information of the position is input through key operations. As a result, input of information of the position may be forgotten, or a present position may be erroneously read. Thus, sure management of information of positions may not be performed.

SUMMARY OF THE INVENTION

The present invention has been devised in consideration of the above-described points. An object of the present invention is to provide a portable terminal device, an information management system and an information management method using the portable terminal device, which can surely manage a position at which read information was read, together with the read information.

A portable terminal device, according to the present invention, comprises:

information collecting means for collecting predetermined information;

position detecting means for detecting the position of the portable terminal device at the present time; and managing means for managing (in each particular embodiment, storing in a memory) the predetermined information collected by the information collecting means and the information of the position, detected by the position detecting means when the information collecting means collects the predetermined information, together.

In this arrangement, the information of the position, detected by the position detecting means when the information collecting means collects the predetermined information, is automatically added to the predetermined information collected by the information collecting means, and the resulting information can be automatically managed. As a result, the information of the position, at which the predetermined information is collected, can be easily managed.

The portable terminal device may further comprise time detecting means for detecting the present time, the managing means managing (in each particular embodiment, storing in the memory) the predetermined information collected by the information collecting means, the information of the position, detected by the position detecting means when the information collecting means collects the predetermined information, and the information of the time, detected by the time detecting means when the information collecting means collects the predetermined information, together.

In this arrangement, the time at which the predetermined information is collected is automatically added to the information including the predetermined information collected by the information collecting means and the information of the position detected by the position detecting means, and the resulting information can be automatically managed. Thereby, the collected information can be managed finely.

The information collecting means may collect identification information of an operator. Thereby, the position of a particular person can be managed.

The information collecting means may comprise a bar code reader. Thereby, the position at which a bar code is read can be automatically managed.

The position detecting means may detect the position at the present time and the present time through a GPS (Global Positioning System). Thereby, the position at the present time and the present time can be managed precisely over a wide area.

The position detecting means may receive position information and time information from nodes of a LAN (Local Area Network) and detect the position at the present time and the present time from the received position information and time information.

Thereby, the positions of persons and/or articles within precincts or the like can be managed by using an existing LAN.

The portable terminal device may further comprise transmitting means for transmitting the predetermined information collected by the information collecting means and the information of the position, detected by the position detecting means when the information collecting means collects the predetermined information, together.

In this arrangement, as a result of the transmitted information being received by a host computer, the host computer can determine whether or not the combination of the collected predetermined information and the detected position, included in the received information, is allowable. For example, it is determined whether or not an article should be collected or delivered at a position. Then, when a result of the determination is transmitted to the portable terminal device, a person who handles the portable terminal device can know the result of the determination then and there.

The information collecting means may comprise:
speech recognizing means for recognizing voices; and information reading means for reading identification information from a voice recognized by the speech recognizing means.

Thereby, each particular person can be easily and accurately identified.

The information collecting means may comprise:

fingerprint recognizing means for recognizing fingerprints; and information reading means for reading identification information from a pattern of a fingerprint recognized by the fingerprint recognizing means.

Thereby, each particular person can be easily and accurately identified.

An information management system, according to the present invention, comprises:

a portable terminal device, comprising information collecting means for collecting predetermined information, position detecting means for detecting the position of the portable terminal device at the present time, and managing means for managing the predetermined information collected by the information collecting means and the information of the position, detected by the position detecting means when the information collecting means collects the predetermined information, together, the portable terminal device further comprising transmitting means for transmitting the predetermined information collected-by the information collecting means and the information of the position, detected by the position detecting means when the information collecting means collects the predetermined information, together;

receiving means for receiving the information transmitted from the transmitting means of the portable terminal device; and managing means for managing the information received through the receiving means (In each particular embodiment, the collected predetermined predetermined information and the information of the detected position, included in the received information, are monitored, or are compared with the contents of a comparison table so as to determine whether or not the combination of the collected predetermined information and the information of the detected position, included in the received information, is allowable. For example, it is determined whether or not an article should be collected or delivered at a position.).

In this arrangement, the information collected by the portable terminal device and the information of the position at which the portable terminal device collects the information can be managed together, and, at this time, the information of the position at the present time can be automatically obtained. As a result, the information management system can be easily used.

An information management method, according to the present invention, comprises the steps of:

a) collecting predetermined information;

b) detecting the position at which the step a) is performed; and c) managing (storing in a memory, in each particular embodiment) the predetermined information collected in the step a) and the information of the position, detected in the step b) when the step a) is performed, together.

In this method, the information of the position, detected in the step b) when the step a) is performed, is automatically added to the predetermined information collected in the step a), and the resulting information can be automatically managed (stored in the memory, in each particular embodiment). As a result, the information of the position, at which the predetermined information is collected, can be easily managed.

The information management method may further comprise the step of d) detecting the present time, the step c) managing the information collected in the step a), the information of the position, detected in the step b) when the step a) is performed, and the information of the time, detected in the step d) when the step a) is performed, together.

In this method, the time at which the predetermined information is collected is automatically added to the information including the predetermined information collected in the step a) and the information of the position detected in the step b), and the resulting information can be automatically managed (stored in the memory, in each particular embodiment). Thereby, the collected information can be managed finely.

Other objects and further features of the present invention will become more apparent from the following detailed description when read in conjunction with the accompanying drawings.

BRIEF DESCRIPTION OF THE DRAWINGS

FIG. 2 shows a comparison table of a host computer in the first embodiment of the present invention;

FIG. 12 shows a general arrangement of a fifth embodiment of the present invention;

FIG. 14 shows a block diagram of a bar code reader in the fifth embodiment of the present invention;

DETAILED DESCRIPTION OF THE PREFERRED EMBODIMENTS

Figure 1:
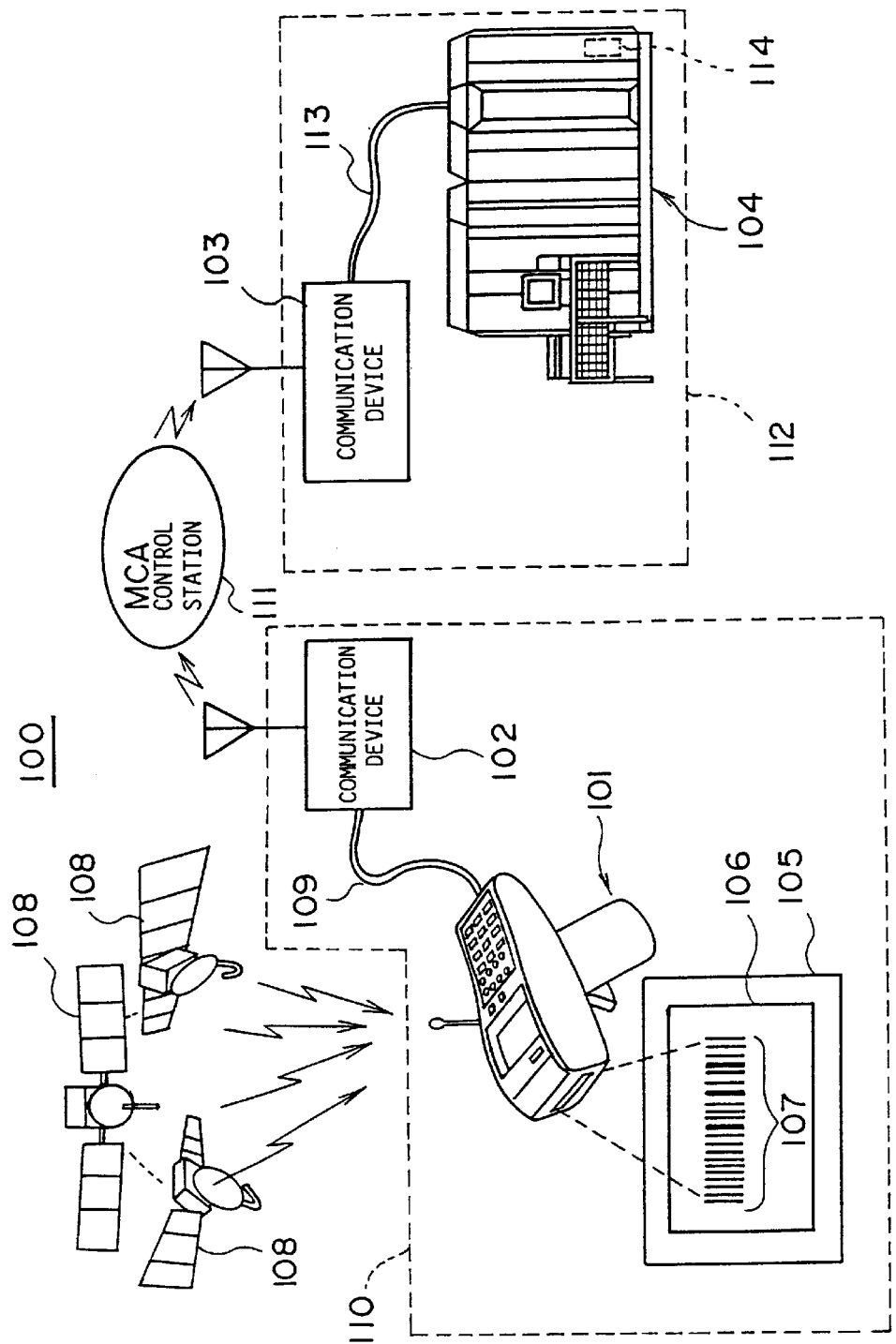
FIG. 1 shows a general arrangement of a first embodiment of the present invention.

FIG. 1 shows a general block diagram of a first embodiment of the present invention.

In the embodiment, a portable terminal device is used in a transportation management system.

The transportation management system 100 in the first embodiment mainly includes a bar code reader 101, communication devices 102, 103 and a host computer 104.

The bar code reader 101 is a portable and handy bar code reader, and, when an article 105 is collected or delivered, the bar code reader 101 can be carried to the site of the collection or delivery. The bar code reader 101 has a function of reading bar codes and an function of detecting positions through GPS (Global Positioning System).

The bar code reader 101 reads a bar code 107 printed on a slip 106 adhered to the article 105 through the function of reading bar codes, detects the position and the time at which the bar code is read through the function of detecting positions automatically, and stores the information of the position and time together with the information of the read bar code. In the function of reading bar codes, the bar code reader 101 optically reads the bar code 107 by causing laser light to irradiate the bar code 107 and detecting the reflected light. In the function of detecting positions, a method of detecting positions and times through GPS is used. In GPS, by detecting signals always transmitted from a plurality of GPS satellites 108, the longitude, the latitude and the altitude of (or the present position of) the bar code reader 101 and the standard time (or the present time) can be detected from phase differences of the detected transmitted signals and so forth.

The bar code reader 101 can be connected with the communication device 102 through a cable 109.

The communication device 102 is, for example, loaded in a vehicle or a train 110 which carries the article 105 collected or to be delivered. By connecting the cable 109 to a connector (not shown in the figure) of the communication device 102, the communication device 102 can be connected with the bar code reader 101. The communication device 102 forms an MCA (Multi Channel Access) radio communication system and communicates with the communication device 103 through an MCA control station 111.

The communication device 102 inputs, through the cable 109, the information read through the bar code reader 101 and the information of the position and time at which the read information was read through the bar code reader 101, stored in the bar code reader 101. The communication device 102 modulates the input information and transmits the modulated information to the communication device 103, provided in a management center 112, through the MCA control station 111.

The communication device 103 receives the information transmitted from the communication device 102 through the MCA control station 111. The communication device 103 is connected with the host computer 104 through a cable 113. The communication device 103 demodulates the received information read through the bar code reader 101 and information of the position and the time at which the read information was read through the connected bar code reader 101, and supplies the demodulated information to the host computer 104 through the cable 113.

At a time of collection or delivery, the host computer 104 manages the situation of the collection or delivery of the article 105 using the information read through the bar code reader 101 and information of the position and the time at which the read information was read through the bar code reader 101, which information has been supplied from the communication device 103. For this purpose, for example, in a case where the article 105 is collected or delivered, a comparison table 114 for indicating a position from which the article 105 is collected or a position to which the article 105 is to be delivered is previously produced.

The host computer 104 checks whether the collection or delivery is performed properly by comparing the above-mentioned received information with the comparison table 114.

Figure 2:
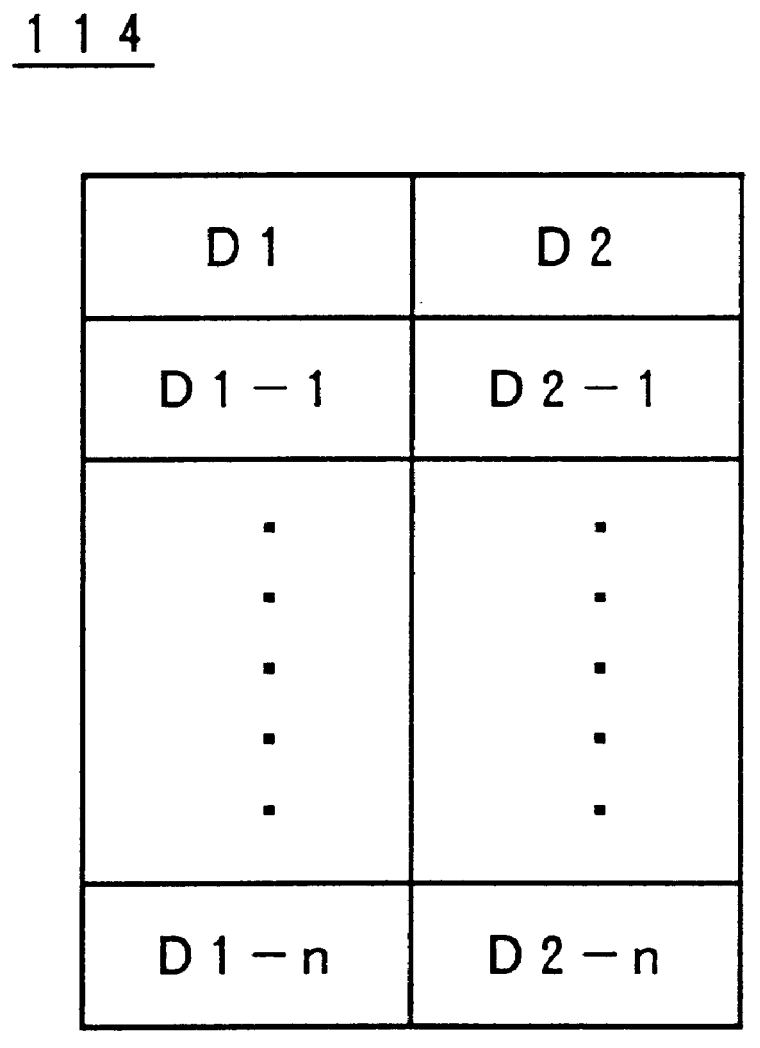

FIG. 2 shows the comparison table 114 of the host computer 104 in the first embodiment of the present invention.

In the comparison table 114, as shown in FIG. 2, each pair of a respective one of information D1 through D1-n of read bar codes and a respective one of information D2 through D2-n of positions at which the article 105 corresponding to the respective bar code is to be collected or delivered is stored.

An arrangement of the bar code reader 101 will now be described with reference to FIG. 3.

Figure 3:
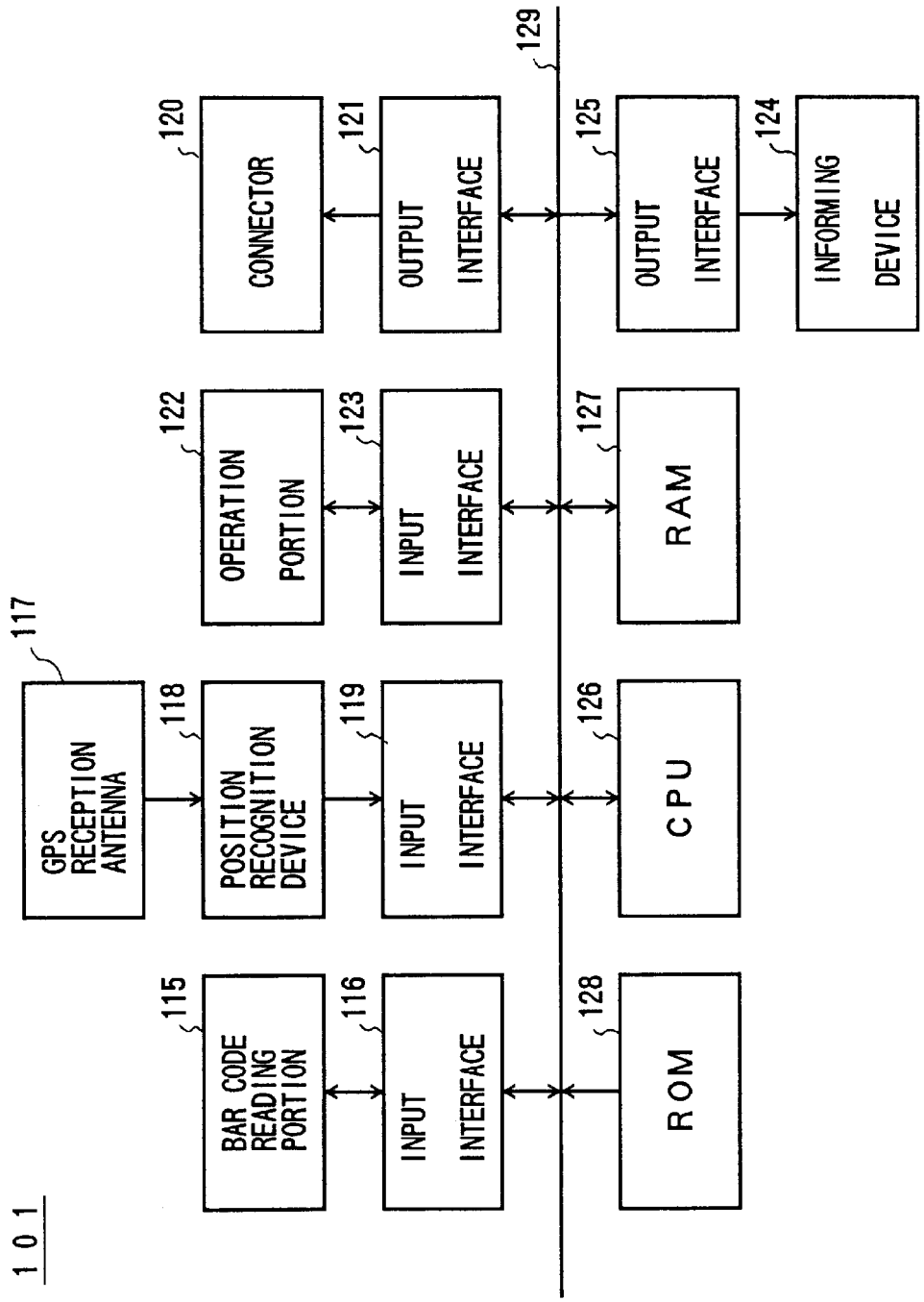
FIG. 3 shows a block diagram of a bar code reader in the first embodiment of the present invention.

FIG. 3 shows a block diagram of the bar code reader 101 in the first embodiment of the present invention.

The bar code reader 101 includes a bar code reading portion 115 which reads the bar code 107 printed on the slip 106 adhered to the article 105, an input interface 116 which inputs the information of the bar code 107 read through the bar code reading portion 115, a GPS reception antenna 117 which receives the signals transmitted from the GPS satellites 108, a position recognition device 118 which detects the position of the bar code reader 101 and the standard time from the signals received through the GPS reception antenna 117 and generates information of the position and information of the standard time, an input interface 119 which inputs the information of the position and the information of the standard time generated by the position recognition device 118, a connector 120 to which the cable 109 for connecting the bar code reader 101 with the communication device 102 is connected, an output interface 121 which outputs information to be transmitted to the communication device 102, an operation portion 122 for inputting various kinds of instructions such as reading of a bar code, transmission of information and so forth, an input interface 123 which inputs the instructions input through the operation portion 122, an informing device 124 which informs a person for collection or delivery of whether or not collection or delivery of the article 105 can be performed, an output interface 125 with which the informing device 124 is connected, a CPU 126 which performs data processing, a RAM 127 which acts as a work area during the data processing performed by the CPU 126 and also stores processed data, a ROM 128 in which programs for data processing to be performed by the CPU 126 are stored, and a bus 129 which connects input interfaces 116, 119, 123, output interfaces 121, 125, CPU 12, RAM 127 and ROM 128.

The bar code reading portion 115 emits laser light through a reading window in response to instructions from the operation portion 122 and receives the light reflected by the bar code 107. Thereby, the bar code reading portion 115 generates a pulse signal in accordance with the arrangement of white and black of the bar code 107. This pulse signal is supplied to the input interface 116.

The input interface 116 converts the signal read through the bar code reading portion 115 into a signal having a data format which is suitable to be output to the bus 129. The CPU 126 causes the read information supplied to the bus 129 from the input interface 116 to have the information of the position of the bar code reader 101 and the information of the standard time recognized by the position recognition device 118 added thereto and to be stored in the RAM 127.

The CPU 126 performs data processing, for example, in accordance with a program stored in the ROM 128.

Figure 4:
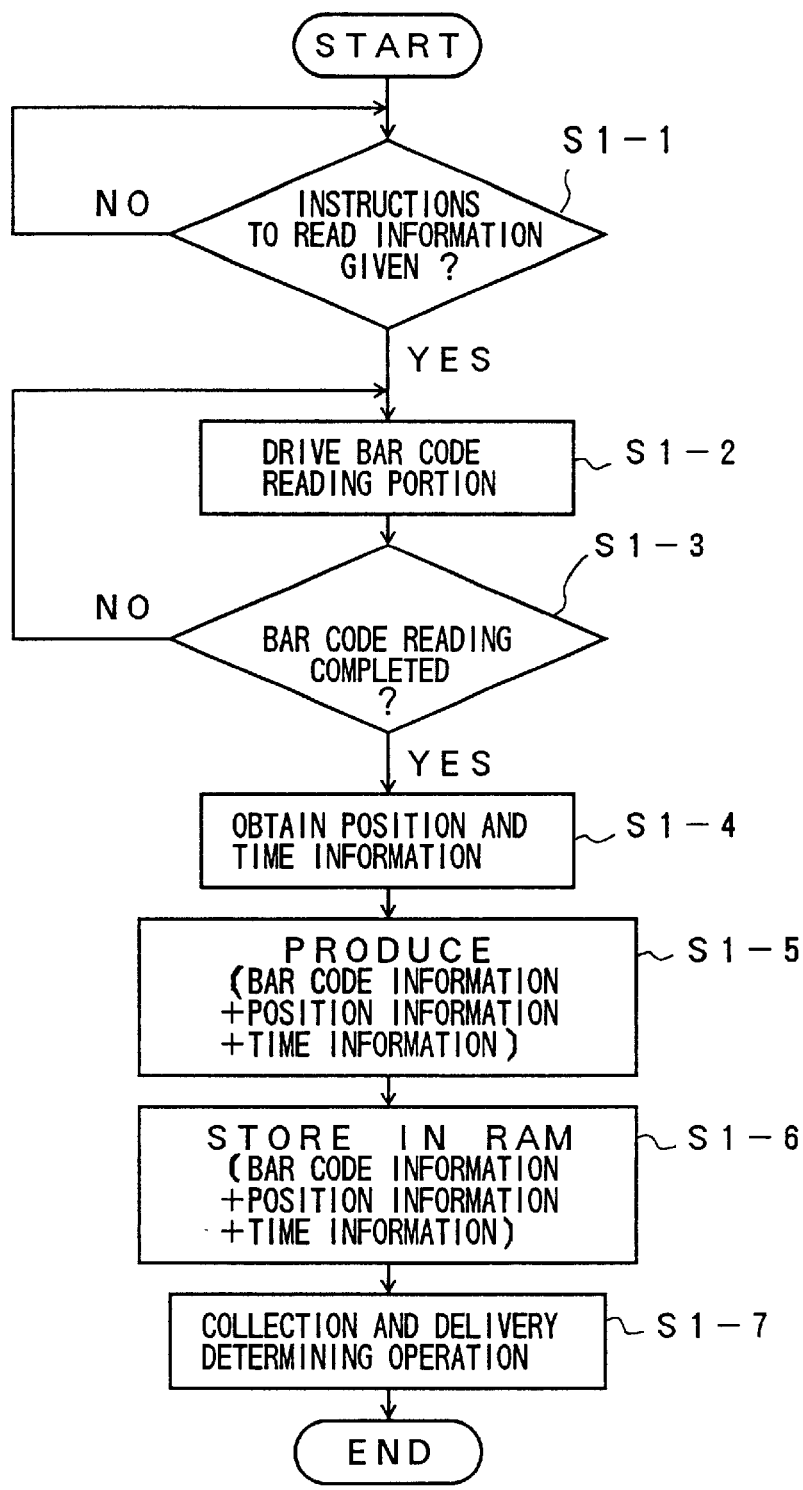
FIG. 4 shows a flowchart of an information reading operation in the first embodiment of the present invention.

With reference to FIG. 4, a bar code reading operation performed by the bar code reader 101 will now be described (this bar code reading operation is also performed in each of second, third and fourth embodiments of the present invention, to be described later.)

FIG. 4 shows a flowchart of the bar code reading operation in the first embodiment of the present invention. When instructions to read the bar code are input through the operation portion 122 (Yes of a step S1-1), the CPU drives the bar code reading portion 115 (step S1-2) so that the bar code reading portion 115 reads the bar code 107 as described above.

After reading of the bar code 107 by the bar code reading portion 115 has been completed (Yes of a step S1-3), the CPU 126 uses the information of the completion of the bar code reading as a trigger and thus provides, to the position recognition device 118, instructions to obtain the information of the position of the bar code reader 101 and the information of the standard time. Then, the position recognition device 118 detects the information of the position of the bar code reader 101 and the information of the standard time as described above. The CPU obtains the information of the position of the bar code reader 101 and the information of the standard time from the position recognition device 118 via the input interface 119 (in a step S1-4).

Then, the CPU 126 produces information as a result of adding the information of the position of the bar code reader 101 at the present time (hereinafter, referred to as position information) and the information of the standard time or the present time (hereinafter, referred to as time information) to the information of the bar code 107 read through the bar code reading portion 115 (hereinafter, referred to as bar code information) (in a step S1-5). In a step S1-6, the CPU 126 stores, in the RAM 127, the information, produced in the step S5-1, including the bar code information, position information and time information. The CPU 126 performs a collection and delivery determining operation (to be described later) so as to determine whether or not the article 105 to which the bar code 107, read through the bar code reading portion 115 as mentioned above, is adhered should be collected or delivered at the present position (in a step S1-7).

When the information including the bar code information, position information and time information is supplied to the host computer 104, the bar code reader 101 is connected to the communication device 102, loaded in the vehicle or train 110, through the cable 109. Then, through the communication device 102, cable 109, MCA radio communication, MCA control station 111, MCA radio communication, communication device 103 and cable 113, the information is transmitted to the host computer 104.

Figure 5:
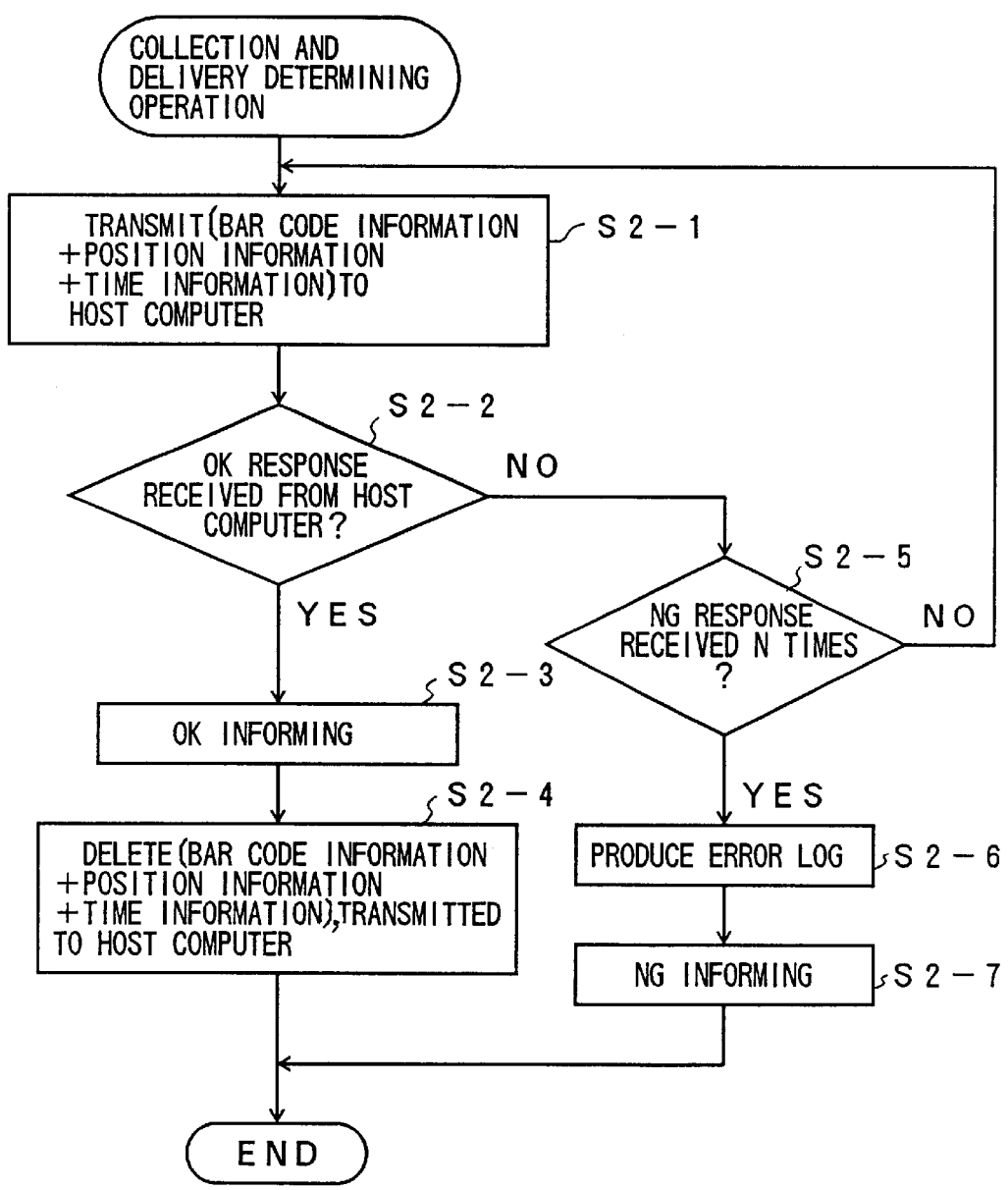
FIG. 5 shows a flowchart of a collection and delivery determining operation in the first embodiment of the present invention.

With reference to FIG. 5, the collection and delivery determining operation will now be described.

FIG. 5 shows a flowchart of the collection and delivery determining operation.

In the collection and delivery determining operation, first, the CPU 126 supplies the information including the bar code information, position information and time information, stored in the RAM 127, to the communication device 102 through the output interface 121 and connector 120, and, transmits the information including the bar code information, position information and time information to the host computer 104 (in a step 2-1).

Then, in a step S2-2, the CPU 126 determines whether or not an OK response from the host computer 104 has been received.

Upon receiving the OK response from the host computer 104 (Yes of the step S2-2), which means that the article 105 should be collected or delivered at the present position, the CPU 126 controls the informing device 124 so as to inform a person for collection and delivery that the article 105 should be collected or delivered at the present position, in a step S2-3. Further, the CPU 126 deletes the information including the bar code information, position information and time information from the RAM 127, in a step S2-4.

Upon receiving only NG (No Good) responses from the host computer 104, after transmitting the information including the bar code information, position information and time information to the host computer 104 n times (Yes of a step S2-5), the CPU 126 determines that the article 105 should not be collected or delivered at the present position, and generates an error log (in a step S2-6). Then, in a step S2-7, the CPU 126 controls the informing device 124 so as to inform the person for collection and delivery that the article 105 should not be collected or delivered at the present position.

An operation of the host computer 104 will now be described with reference to FIG. 6.

Figure 6:
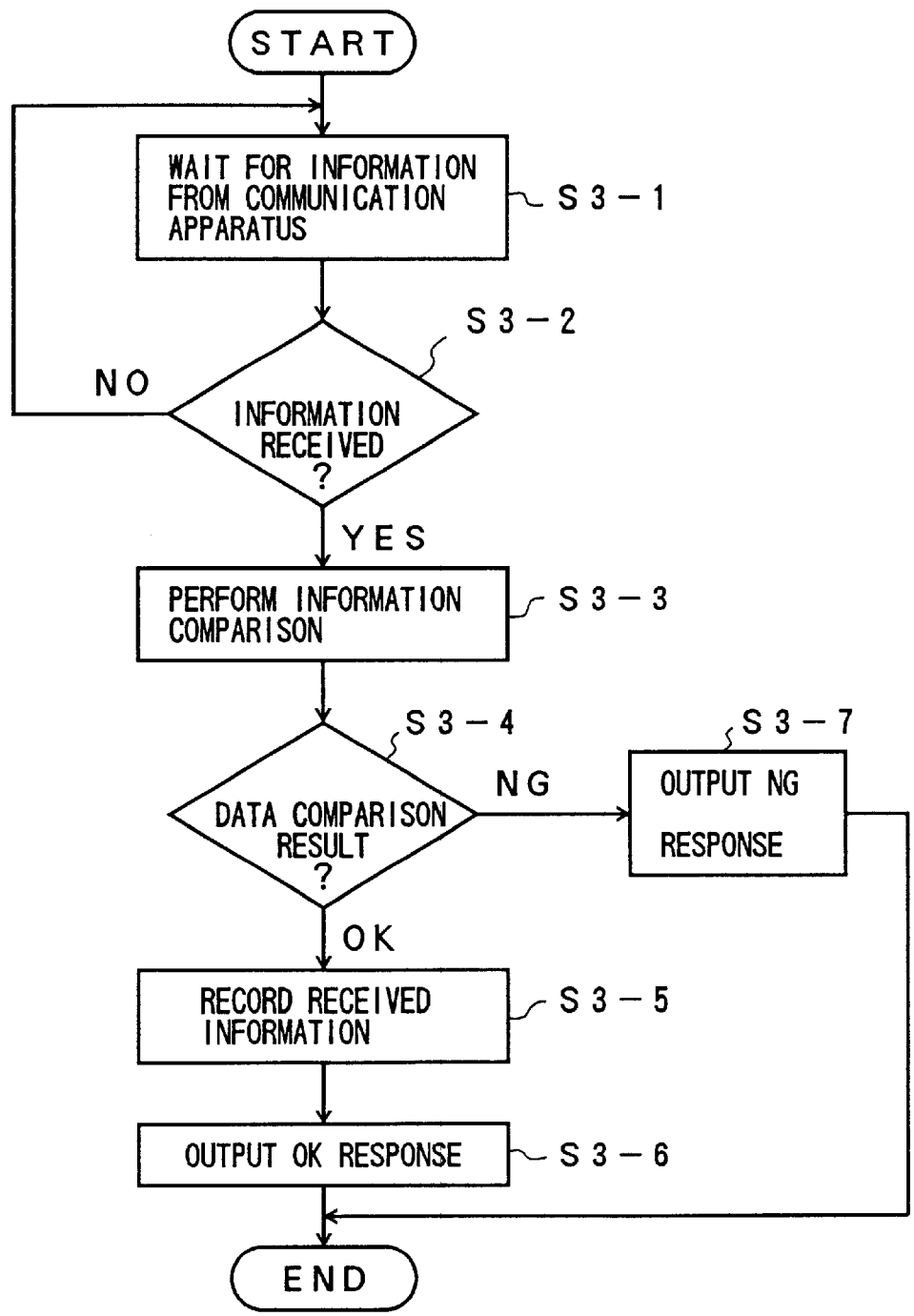
FIG. 6 shows a flowchart of an information reception operation in the first embodiment of the present invention.

FIG. 6 shows a flowchart of a data reception operation of the host computer 104.

The host computer 104 waits for the information transmitted from the communication device 103, in a step S3-1. Upon receiving the information from the communication device 103 (Yes of a step S3-2), the host computer 104 determines whether or not the article 105 should be collected or delivered at the present position, using the received information, in a step S3-3.

In the step S3-3, a comparison operation is performed using the comparison table 114 in which, for the bar code information of each article 105, information of a position at which the article 105 is to be collected or delivered is stored. When the combination of the received bar code information and the position information does not exist in the comparison table 114 (NG of a step S3-4), the host computer 104 transmits the NG response to the bar code reader 101 through the communication device 103, in a step S3-7. When the combination of the received bar code information and the position information exists in the comparison table 114 (OK of the step S3-4), the host computer 104 stores the received information therein, in a step S3-5. Then, the host computer 104 transmits the OK response to the bar code reader 101 through the communication device 103, in a step S3-6.

In the first embodiment of the present invention, it is possible to determine, using the bar code information of the bar code given to each article and the position information, for each article, whether or not the article should be collected or delivered at a particular position. As a result, erroneous collection or delivery of the article can be eliminated. Further, because the position information can be obtained through GPS, automatically, operation of the bar code reader 101 is easy, and erroneous operation of the bar code reader 101 can be eliminated.

In the first embodiment, the communication device 102 is separated from the bar code reader 101 and is provided in the vehicle or train for collection and delivery 110. However, it is also possible to provide the communication device 102 integrally with the bar code reader 101.

In the first embodiment, the information including the bar code information, position information and time information is transmitted to the host computer 104 which compares the received bar code information and position information with the corresponding information of the comparison table 114 so as to determine, for each article, whether or not the article should be collected or delivered at the present position, in order to eliminate erroneous collection or delivery of articles at particular positions. However, it is also possible that the comparison using the comparison table 114 is not performed, and only collection of the information including the bar code information, position information and time information is performed. In such a case, the host computer 104 merely stores, as one information unit, the information including the bar code information, position information and time information, transmitted from the bar code reader 110. By using the stored information, it is possible to confirm that collection and delivery of articles have been surely performed.

Figure 7:
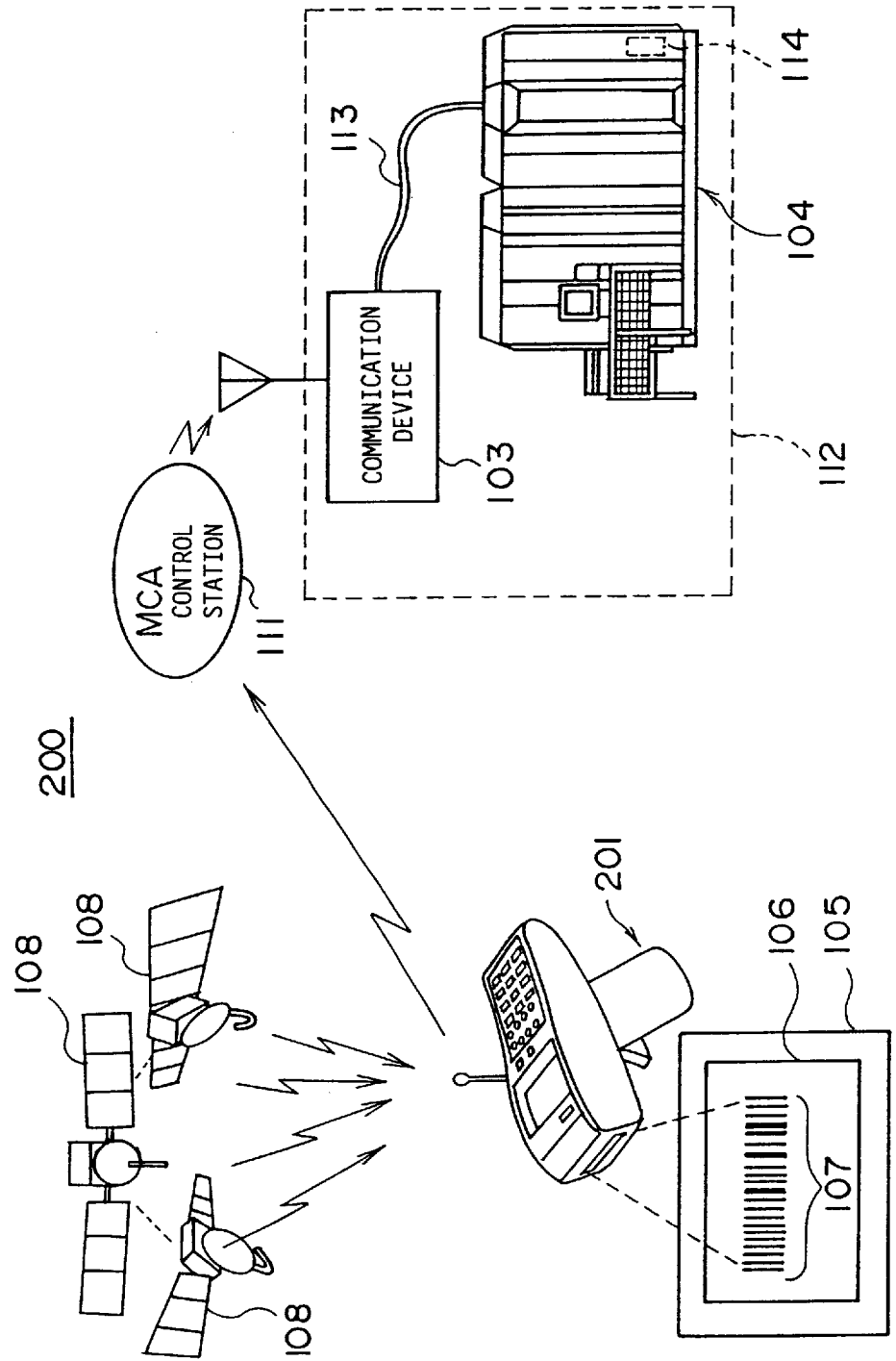
FIG. 7 shows a general arrangement of a second embodiment of the present invention.

FIG. 7 shows a general arrangement of the second embodiment of the present invention. In the figure, to the equipment/objects the same as those of FIG. 1, the same reference numerals are given and the descriptions thereof will be omitted.

In a transportation management system 200 in the second embodiment, a communication device 202 is provided inside the housing of a bar code reader 201. The communication device 202 forms the MCA radio communication system, and thereby, the external communication device 102 shown in FIG. 1 is not necessary. Further, connection between the bar code reader 201 and the communication device 202 through the cable 109 is not necessary.

Figure 8:
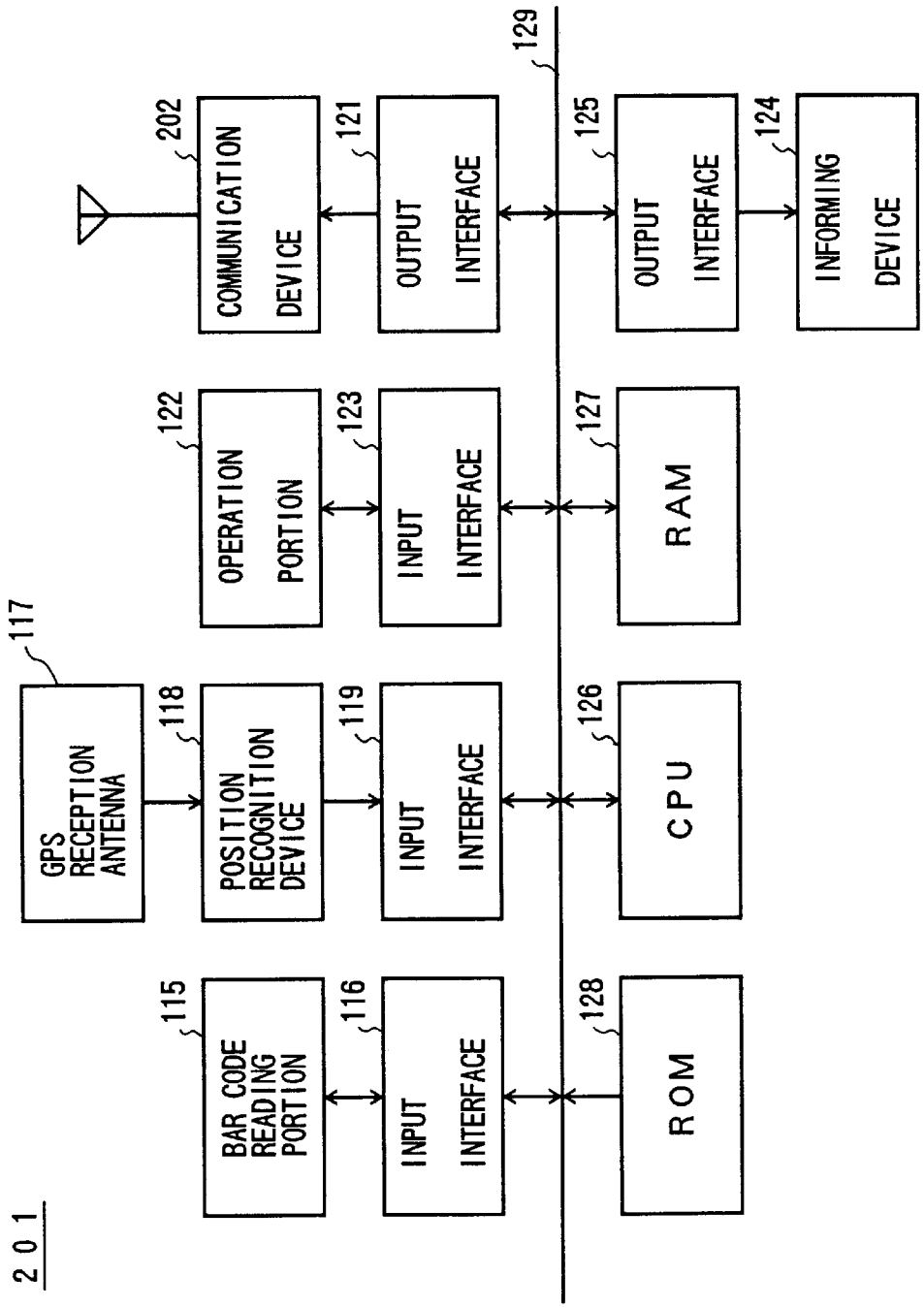
FIG. 8 shows a block diagram of a bar code reader in the second embodiment of the present invention.

FIG. 8 shows a block diagram of the bar code reader 201 in the second embodiment of the present invention. In the figure, to the blocks the same as those of FIG. 3, the same reference numerals are given and the descriptions thereof will be omitted.

In the bar code reader 201 in the second embodiment, the communication device 202 is provided inside the housing, instead of the connector 120 of FIG. 3. The communication device 202 is directly connected with the output interface 121.

By using the second embodiment, in a place in which articles 105 have been collected, the bar code of each article 105 is read, and it is determined, then and there, whether or not the article should be collected from the place. Accordingly, collection of articles from the place can be performed efficiently. Further, because the external connection of the bar code reader with the communication device is not necessary, handling of the bar code reader can be easily performed.

In each of the first and second embodiment, the MCA radio communication system is used as communicating means. However, it is also possible that, for example, a mobile communications network is used for performing communication with the host computer 104.

Figure 9:
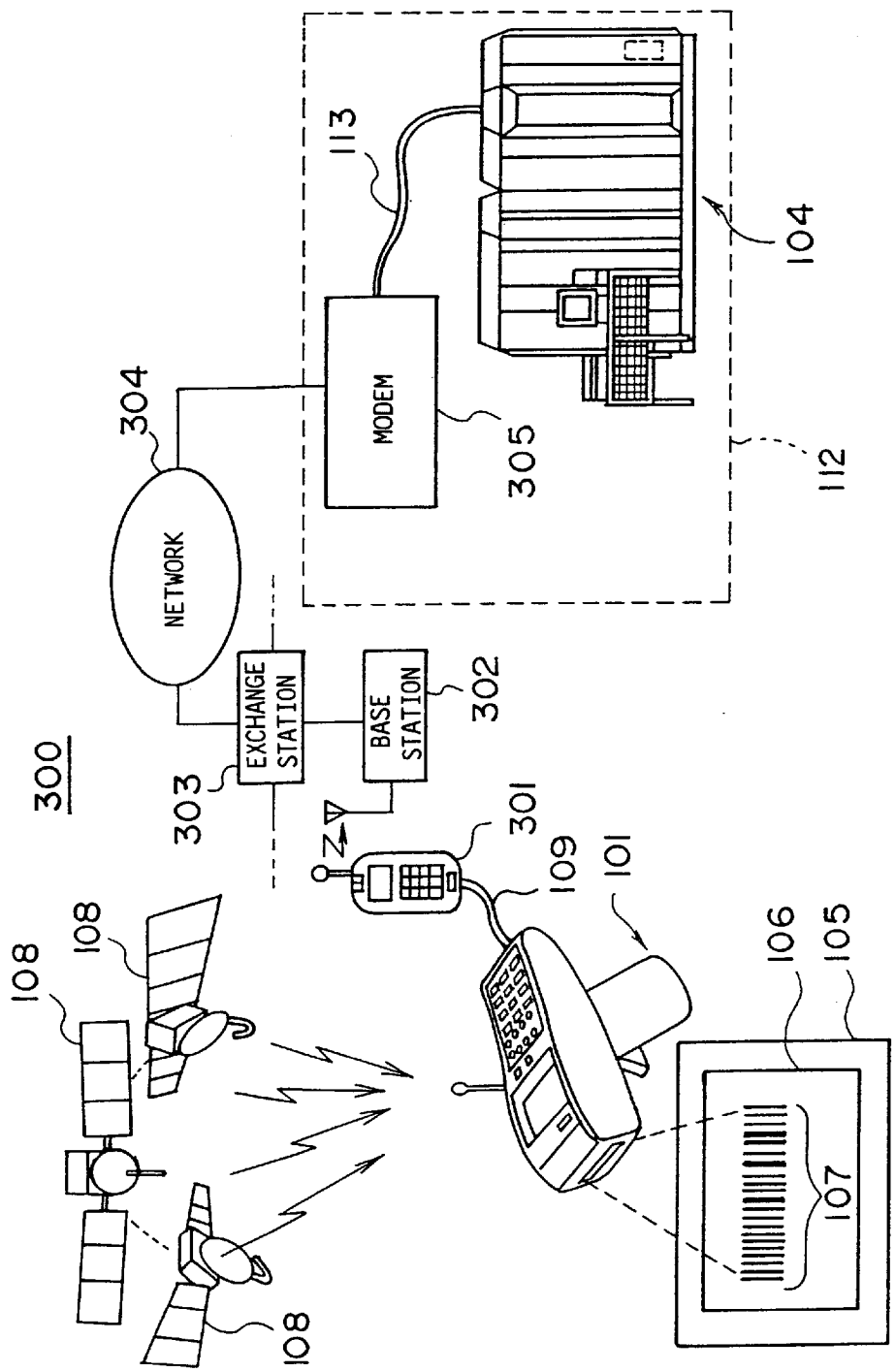
FIG. 9 shows a general arrangement of a third embodiment of the present invention.

FIG. 9 shows a general arrangement of the third embodiment of the present invention. In the figure, to the equipments/things the same as those of FIG. 1, the same reference numerals are given and the descriptions thereof will be omitted.

In a transportation management system 300 in the third embodiment, a bar code reader 101 is connected with a portable telephone 301 through a cable 102. The portable telephone 301 is connected with a network 304 via a base station 302 and an exchange station 303, and is connected with the host computer 104 via a modem 305 from the network 304. Thereby, communication between the bar code reader 101 and the host computer 104 can be performed.

In the third embodiment, the portable telephone 301 is separated from the bar code reader 101. However, it is also possible that the functions of the portable telephone 301 are provided in the bar code reader 101.

Figure 10:
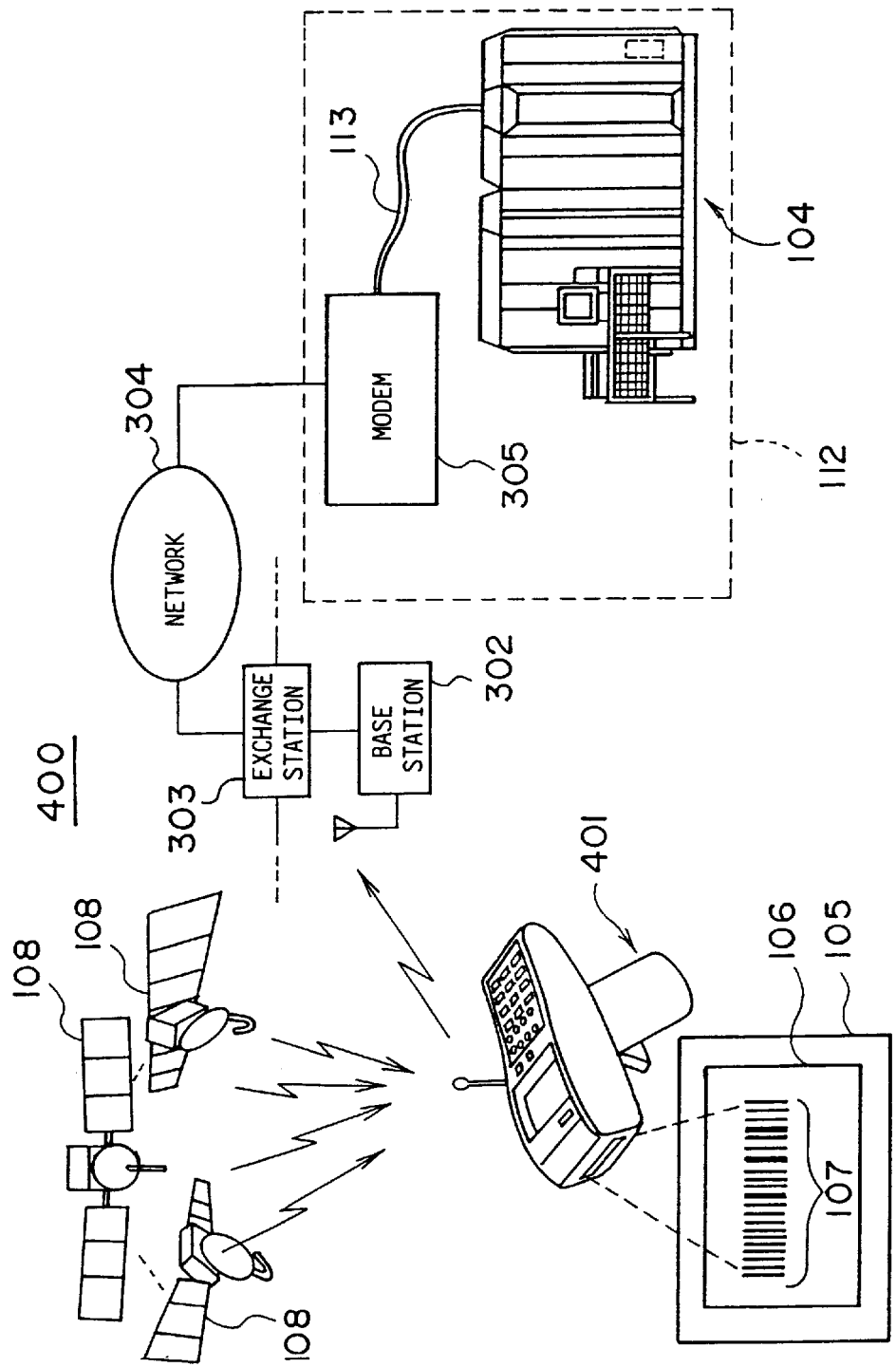
FIG. 10 shows a general arrangement of a fourth embodiment of the present invention.

FIG. 10 shows a general arrangement of the fourth embodiment of the present invention. In the figure, to the equipment/objects the same as those of FIG. 1, the same reference numerals are given and the descriptions thereof will be omitted.

In a transportation management system 400 in the fourth embodiment, a communication device 402 is provided inside the housing of a bar code reader 401. The communication device 402 can perform communication through a mobile communications network. Thereby, the external portable telephone 301 of FIG. 9 is not necessary and the connection with the communication device through the cable 109 is not necessary.

Figure 11:
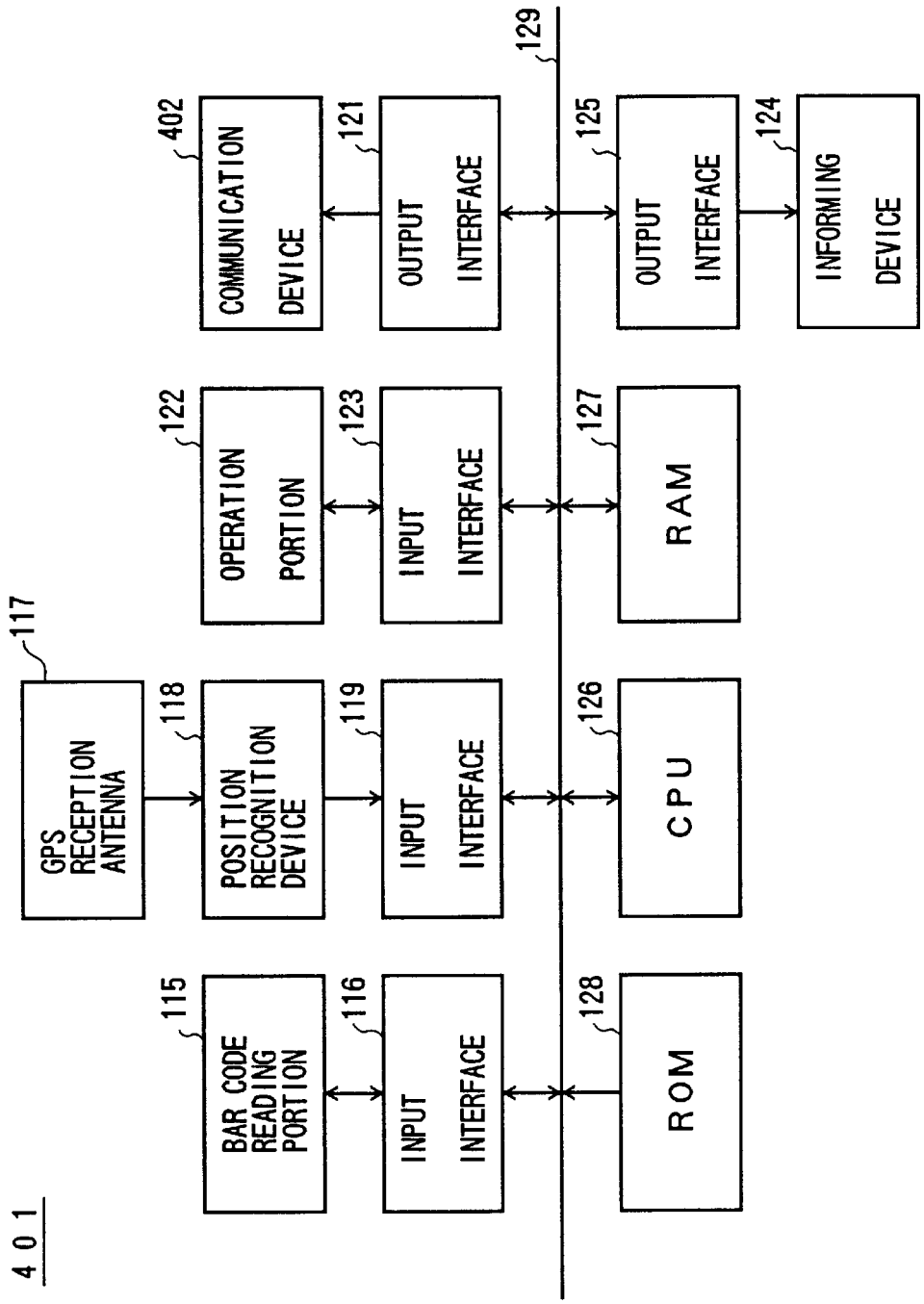
FIG. 11 shows a block diagram of a bar code reader in the fourth embodiment of the present invention.

FIG. 11 shows a block diagram of the bar code reader 401 in the fourth embodiment of the present invention. In the figure, to the blocks the same as those of FIG. 3, the same reference numerals are given and the descriptions thereof will be omitted.

In the bar code reader 401 in the fourth embodiment, the communication device 402 is provided inside the housing, instead of the connector 120 of FIG. 3. The communication device 402 is directly connected with the output interface 121.

By using the fourth embodiment, in a place in which articles 105 have been collected, the bar code of each article 105 is read, and it is determined, then and there, whether or not the article should be collected from the place. Accordingly, collection of articles from the place can be performed efficiently. Further, because the external connection of the bar code reader with the communication device is not necessary, handling of the bar code reader can be easily performed.

In each of the first, second, third and fourth embodiments, GPS is used as position detecting means in consideration of transportation of articles in a wide area. However, it is not necessary to be limited to this. For example, in a case where transportation of articles is performed within a relatively narrow area such as precincts of a factory, an existing radio LAN (Local Area Network) may be used as position detecting means.

FIG. 12 shows a general arrangement of a fifth embodiment of the present invention. In the figure, to the equipment/objects the same as those of FIG. 1, the same reference numerals are given and the descriptions thereof will be omitted.

In a transportation management system 500 in the fifth embodiment, the bar code reader 501 detects information transmitted from one or some of nodes 503-1 through 503-n of a LAN 502 and a communication device 504, which information includes position and time information. Thereby, the present position of the bar code reader 501 and the present time are detected.

Figure 13A:
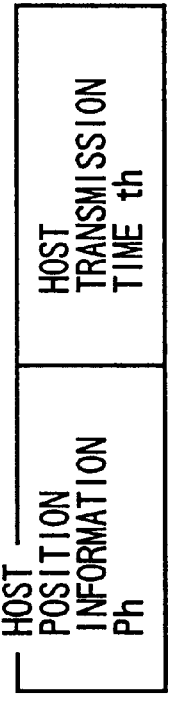
FIGS. 13A, 13B and 13C show information transmitted from position and time information transmitting units in the fifth embodiment of the present invention.
Figure 13B:
Figure 13C:
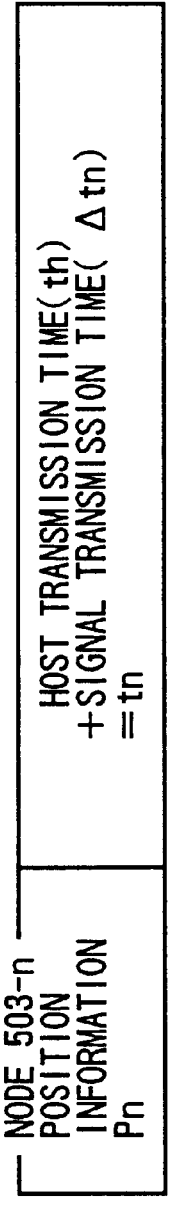

FIGS. 13A, 13B and 13C show arrangements of the information, transmitted from the communication device 504, nodes 503-1 and 503-n, in the fifth embodiment of the present invention. FIG. 13A shows the information transmitted from the host computer 104 to the LAN 502 and to the area covered by the communication device 504, through the communication device 504. FIG. 13B shows the information transmitted from the node 503-1 to the area covered by the node 503-1. FIG. 13C shows the information transmitted from the node 503-n to the area covered by the node 503-n.

The communication device 504 is connected with the host computer 104 and, through the communication device 504, the host computer 104 transmits position information Ph indicating the position of the host computer 104 and the time information indicating the time th when the host computer 104 transmits, through the communication device 504, the position information Ph, as shown in FIG. 13A.

After receiving the position information Ph and the time information of the time th transmitted from the host computer 104, the node 503-1 transmits externally the position information P1 indicating the position of the node 503-1 and the time information indicating the time t1, obtained as a result of the time Δt1 being added to the time th, as shown in FIG. 13B. The time Δt1 is the time required for the signal transmission from the host computer 104 to the node 503-1 via the communication device 504 and the LAN 502. This signal transmission time Δt1 is previously measured and stored in the node 503-1.

Similarly, after receiving the position information Ph and the time information indicating the time th transmitted from the host computer 104, the node 503-n transmits externally the position information Pn indicating the position of the node 503-n and the time information indicating the time tn, obtained as a result of the time Δtn being added to the time th, as shown in FIG. 13C. The time Δtn is the time required for the signal transmission from the host computer 104 to the node 503-n via the communication device 504 and the LAN 502. This signal transmission time Δtn is previously measured and stored in the node 503-n.

Similarly, after receiving the position information Ph and the time information indicating the time th transmitted from the host computer 104, each of the nodes 503-2 through 503-(n−1) transmits externally the position information, a respective one of P2 through P(n−1), indicating the position of this node and the time information indicating the time, a respective one of t2 through t(n−1), obtained as a result of the time, a respective one of 6t2 through Δt(n−1), being added to the time th. The time, the respective one of Δt2 through Δt(n−1), is the time required for the signal transmission from the host computer 104 to this node via the communication device 504 and the LAN 502. This signal transmission time, the respective one of Δt2 through Δt(n−1), is previously measured and stored in this node.

When reading the bar code 107, the bar code reader 501 receives the information transmitted from one or some of the communication device 504 of the management center 112 and the nodes 503-1 through 503-n, and thus, obtains position information indicating the position of the bar code reader 501 at the time of reading the bar code 107 and time information indicating the time of reading the bar code 107.

An arrangement of the bar code reader 501 will now be described.

FIG. 14 shows a block diagram of the bar code reader 501 in the fifth embodiment of the present invention. In the figure, to the blocks the same as those of FIG. 3, the same reference numerals are given and the descriptions thereof will be omitted.

The bar code reader 501 in the fifth embodiment includes a communication device 505 which performs communication with one or some of the communication device 504 in the management center 112 and the nodes 503-1 through 503-n of the radio LAN 502, and an input and output interface 506 which connects the communication device 505 with the bus 129.

In the fifth embodiment, when reading the bar code 107, the bar code reader 501 receives, through the communication device 505, the information, such as that shown in FIGS.13A, 13B and/or 13C, transmitted from one or some of the communication device 504 of the management center 112 and the nodes 503-1 through 503-n, and thus, obtains the position information indicating the position of the bar code reader 501 at the time of reading the bar code 107 and the time information indicating the time of reading the bar code 107.

Figure 15:
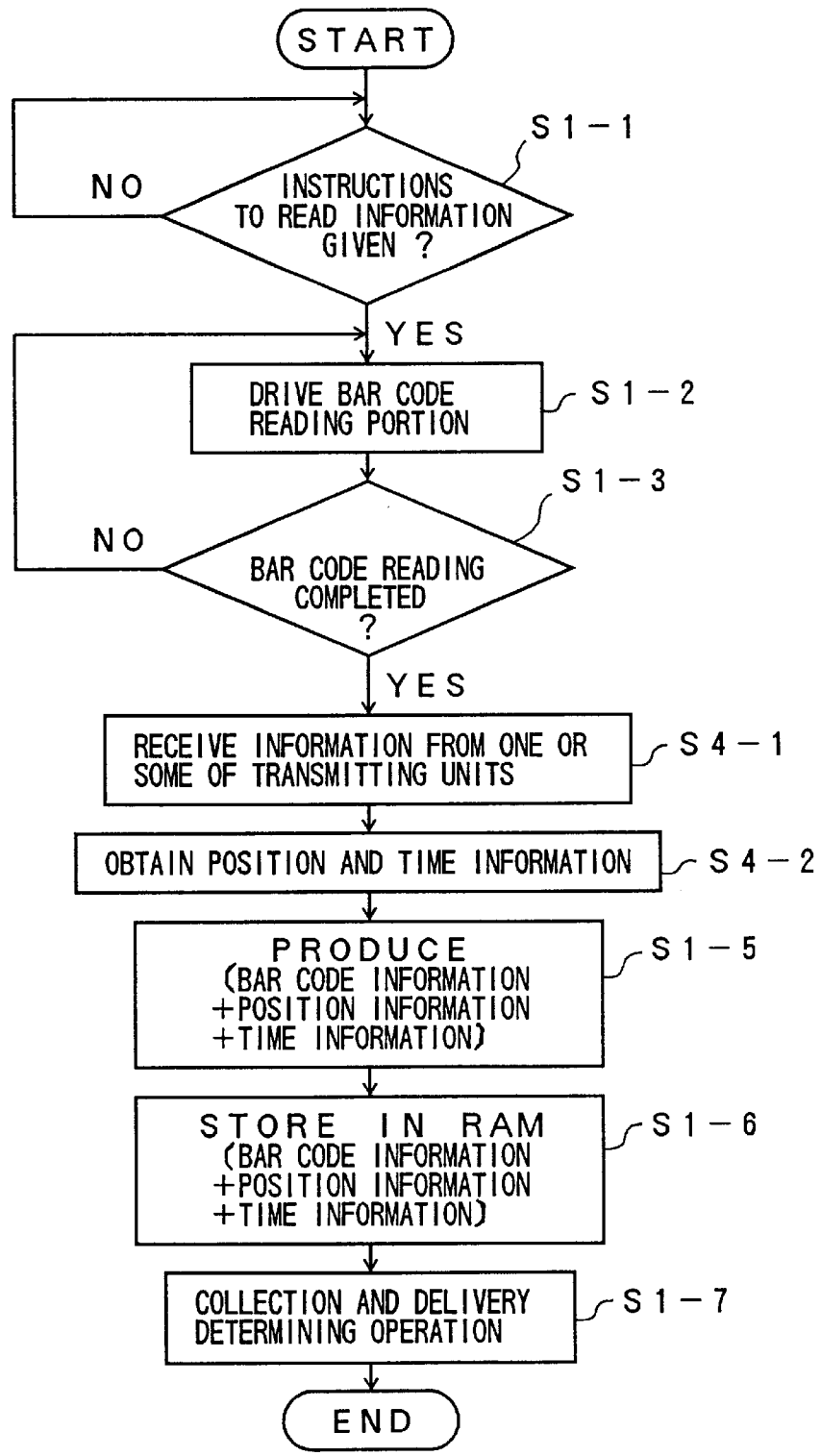
FIG. 15 shows a flowchart of an information reading operation in the fifth embodiment of the present invention.

FIG. 15 shows a flowchart of an information reading operation of the fifth embodiment of the present invention. In the figure, to the steps the same as those of FIG. 4, the same reference numerals are given and the descriptions thereof will be omitted.

In the fifth embodiment, after the bar code 107 is read through the bar code reading portion 115 in the step S1-3, the CPU 126 accesses the input and output interface 506 and obtains the information transmitted from one or some of the communication device 504 connected with the host computer 104 and the nodes 503-1 through 503-n (hereinafter, each of which being referred to as a position and time information transmitting unit) (in a step S4-1).

Then, in a step 4-2, the CPU 126 obtains the position information and the time information from the information received in the step S4-1. Each the position and time information transmitting units always transmits and periodically updates the information, such as that shown in FIGS.13A, 13B and 13C, so that the CPU 126 can obtain the position information and the time information of the time near to the present time.

The operation of the step S4-2 of obtaining the position information and the time information will now be described.

Figure 16:
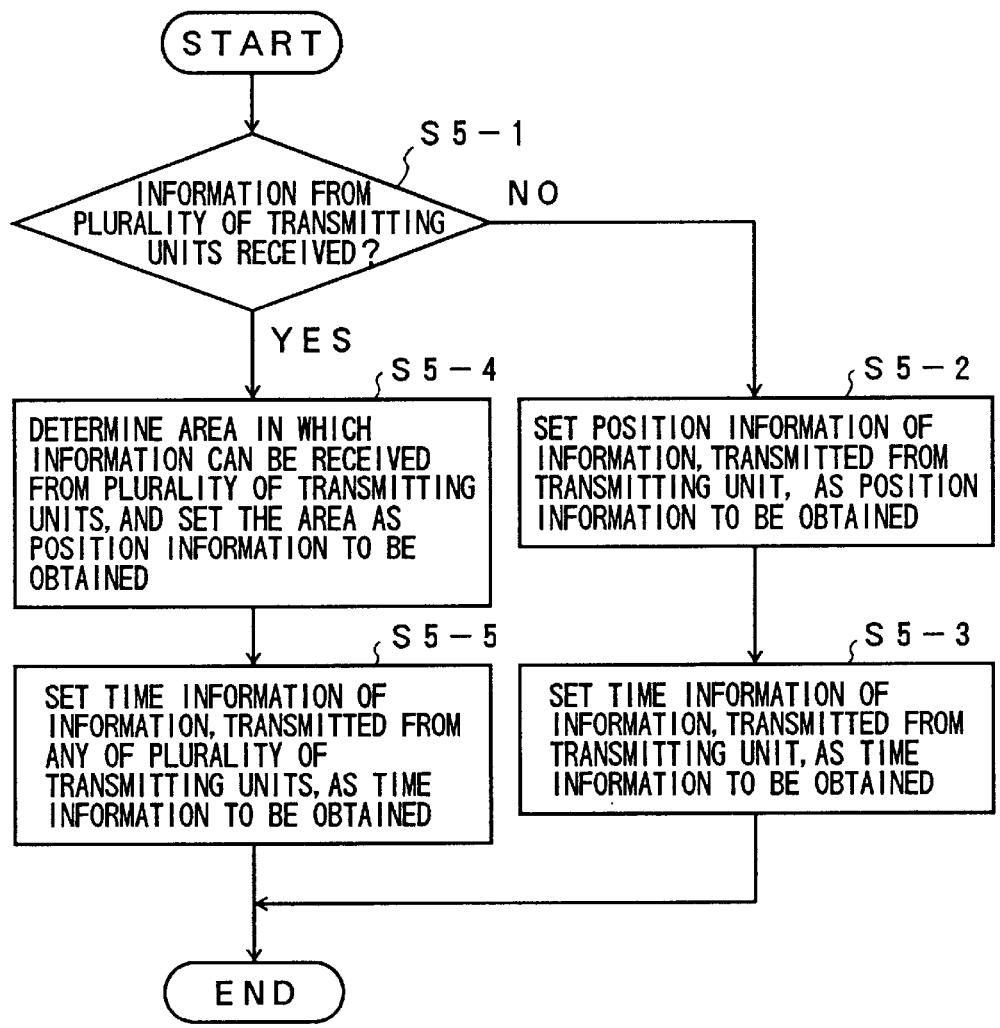
FIG. 16 shows a flowchart of an operation of obtaining position information and time information in the fifth embodiment of the present invention.
Figure 17:
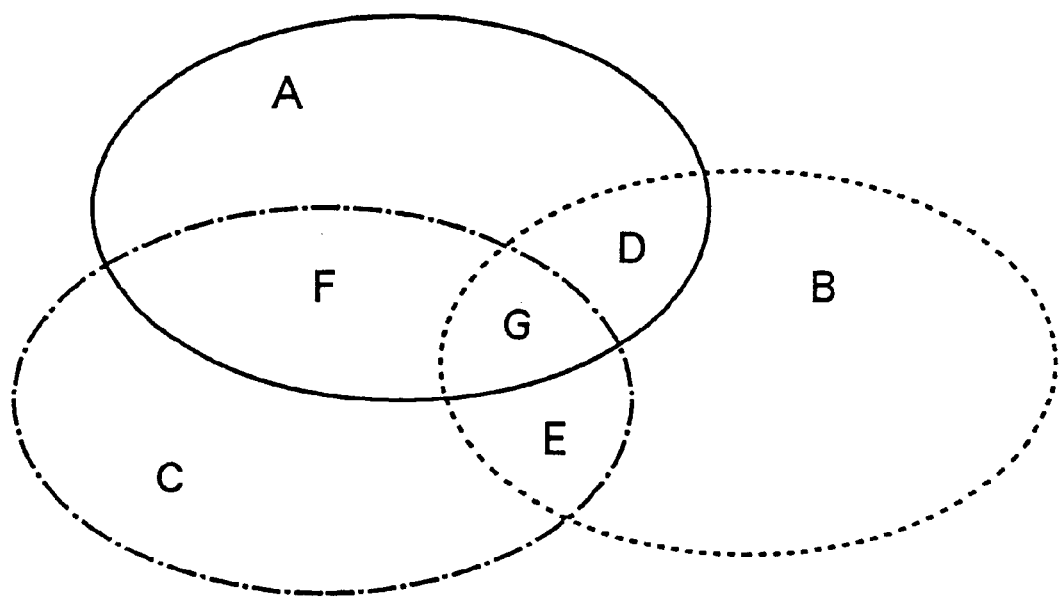
FIG. 17 shows areas covered by nodes of a radio LAN, respectively.

FIG. 16 shows a flowchart of the operation of obtaining the position information and the time information in the fifth embodiment of the present invention. FIG. 17 shows areas covered by the nodes of the radio LAN 502, respectively.

In the operation of obtaining the position information and time information in the fifth embodiment, when the information transmitted from only one of the time and position information transmitting units is received in the step S4-1 (No of a step S5-1), the position information (one of Ph, P1 through Pn) of the received information is determined as the position information indicating the position at which the bar code reader 501 reads the bar code 107 at the present time (in a step S5-2), and the time information of the time (one of th, t1 through tn) of the received information is determined as the time information indicating the present time at which the bar code reader 501 reads the bar code 107 (in a step S5-3).

Further, when the information transmitted from a plurality of the position and time information transmitting units is received in the step S4-1 (Yes of the step S5-1), the area in which the information transmitted from the plurality of the position and time information transmitting units is received is determined and is used as the position information indicating the position at which the bar code reader 501 reads the bar code 107 at the present time (in a step S5-4). For example, in FIG. 17, the area A defined by the solid line is the area in which the information transmitted from the node 503-k can be received, the area B defined by the broken line is the area in which the information transmitted from the node 503-(k+1) can be received and the area C defined by the chain line is the area in which the information transmitted from the node 503-(k+2) can be received.

The area in which the information transmitted from all of the nodes 503-k, 503-(k+1) and 503-(k+2) can be received is the area G shown in FIG. 17. When the information transmitted from all of the nodes 503-k, 503-(k+1) and 503-(k+2) is received in the step S4-1, the area G is determined as the position of the position information indicating the position at which the bar code reader 501 reads the bar code 107 at the present time.

The area in which the information transmitted from the nodes 503-k and 503-(k+1) can be received is the area D and G. When the information transmitted from the nodes 503-k and 503-(k+1) is received in the step S4-1, the area D and G is determined as the position of the position information indicating the position at which the bar code reader 501 reads the bar code 107 at the present time.

The area in which the information transmitted from the nodes 503-k and 503-(k+2) can be received is the area F and G. When the information transmitted from the nodes 503-k and 503-(k+2) is received in the step S4-1, the area F and G is determined as the position of the position information indicating the position at which the bar code reader 501 reads the bar code 107 at the present time.

The area in which the information transmitted from the nodes 503-(k+1) and 503-(k+2) can be received is the area G and E. When the information transmitted from the nodes 503-(k+1) and 503-(k+2) is received in the step S4-1, the area G and E is determined as the position of the position information indicating the position at which the bar code reader 501 reads the bar code 107 at the present time.

The position information to be obtained for each combination of the position information of a plurality of the position and time information transmitting units, from which the bar code reader 501 receives the information, such as the above-mentioned position information for the area G, for the area G and D, for the area F and G and for the area G and E, is previously stored in the ROM 128. Accordingly, the position information for any combination of the position information of a plurality of the position and time information transmitting units, from which the bar code reader 501 receives the information, can be determined as a result of the ROM 128 being referred to.

The time information of any one of the plurality of the position and time information transmitting units, from which the bar code reader 501 receives the information in the step S4-1, is determined as the time information indicating the present time at which the bar code reader 501 reads the bar code 107 (in a step S5-5).

Thus, through the steps S5-4 and S5-5, the position information indicating the position at which the bar code reader 501 reads the bar code 107 at the present time and the time information indicating the present time at which the code reader 501 reads the bar code 107 in the case where the bar code reader receives the information from a plurality of the position and time information transmitting units are obtained.

Then, the steps S1-5, S1-6 and S1-7 of each of the first, second, third and fourth embodiments are performed, and thus, the above-described collection and delivery determining operation using the result of the comparison operation performed by the host computer 104 is performed. The radio LAN is also used in the collection and delivery operation for transmitting the bar code information, position information and time information to the host computer 104 from the bar code reader 501.

Thus, in the fifth embodiment, the existing LAN is used, and thereby, confirmation of collection and delivery of articles can be performed.

In the fifth embodiment, the position and time information transmitting units include the communication device 504 in the management center 112. However, it is also possible that the position and time information transmitting units do not include the communication device 504, and only include the nodes 503-1 through 503-n of the LAN 502.

In the first through fifth embodiments, the MCA radio communication system, portable telephone and radio LAN are used as communicating means. Thereby, information obtained by the bar code reader acting as a terminal device at a remote position is transmitted to the host computer 104. However, it is not necessary to be limited to this. Instead, for example, devices in accordance with the IrDA (Infrared Data Association) standard may be provided for communication between the bar code reader and the host computer 104.

In each of the first through fifth embodiments, the bar code reader is used as a terminal device, a bar code 107 is given to each article 105 and thereby, the article 105 is identified. However, it is not necessary to be limited to this. For example, it can be considered that a person for collection and delivery who collects and delivers articles 105 is identified and managed.

Figure 18:
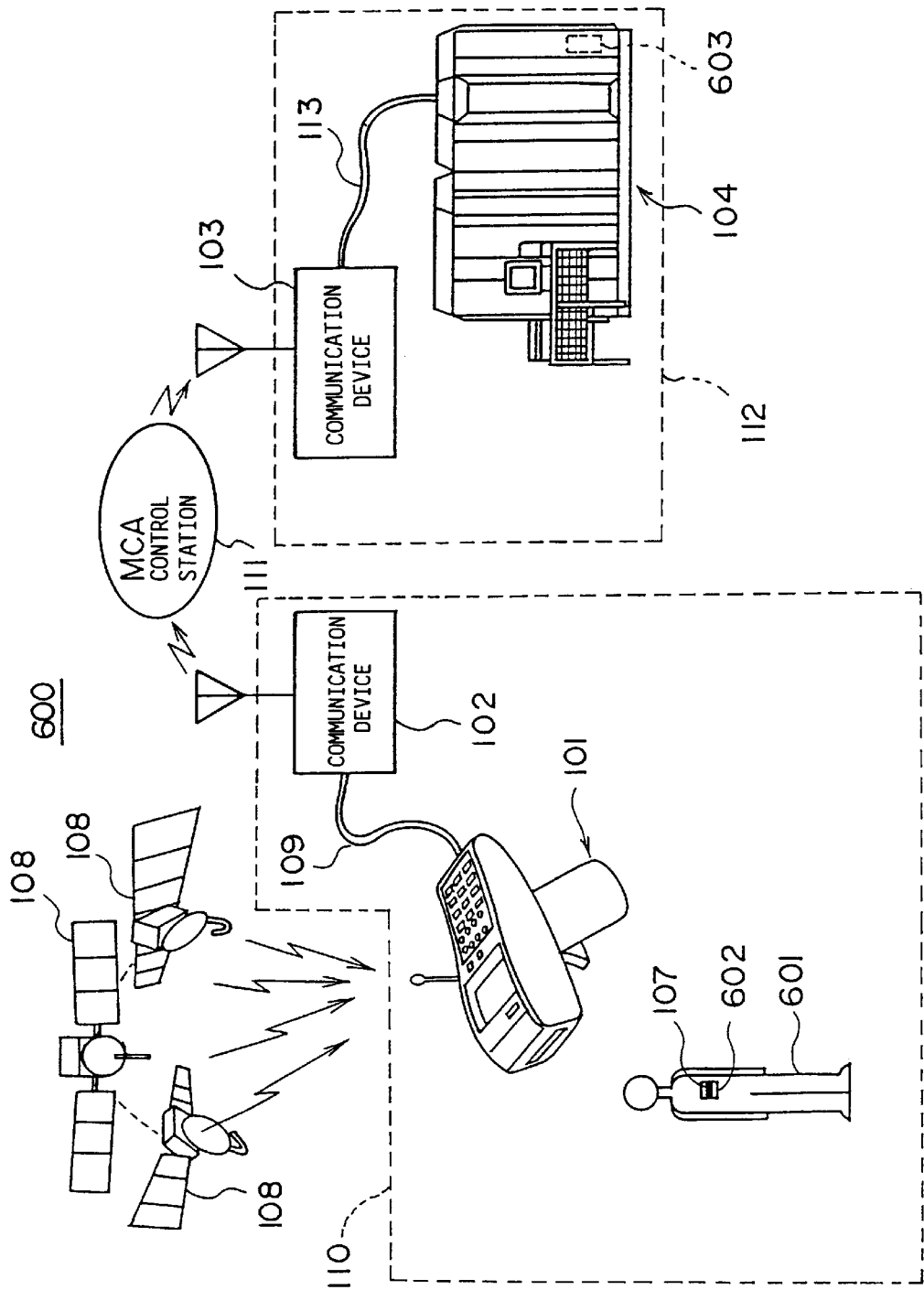
FIG. 18 shows a general arrangement of a sixth embodiment of the present invention.

FIG. 18 shows a general arrangement of a sixth embodiment of the present invention. In the figure, to the equipment/objects the same as those of FIG. 1, the same reference numerals are given and the descriptions thereof will be omitted.

In a transportation management system 600 in the sixth embodiment, an ID is given to each person for collection and delivery 601 for identifying the person for collection and delivery 601, and a bar code 107 indicating the given ID is printed on a badge 602 or the like which each person for collection and delivery 601 wears. In the host computer 104, a comparison table 603 in which position information indicating a position at which each person for collection and delivery 601 should collect or deliver an article or articles is stored.

Before a person for collection and delivery 601 collects or delivers an article or articles, the person uses the bar code reader 101 and causes the bar code reader 101 to read the bar code 107 printed on the badge 602 which he or she wears. Then, similarly to the case of each of the first through fifth embodiments, the position of the bar code reader 101 is detected through GPS, LAN or the like, and position information indicating this position is supplied to the host computer 104 together with the ID obtained from the bar code 107 read through the bar code reader 101.

The host computer 104 compares the supplied combination of the ID and the position information with those stored in the comparison table 603. Then, when if the supplied combination of the ID and the position information exist in the comparison table 603, the host computer 104 supplies, to the bar code reader 101, the information indicating that this person 601 can collect or deliver an article or articles at the present position. When the supplied combination of the ID and the position information does not exist in the comparison table 603, the host computer 104 supplies, to the bar code reader 101, the information indicating that this person 601 should not collect or deliver an article or articles at the present position.

Thereby, it can be prevented that a particular person for collection and delivery 601 collects or delivers an article or articles at a present position although it is not scheduled that this person 601 collects or delivers an article or articles at the present position.

In the sixth embodiment, the bar code 107 is used for identifying the person for collection and delivery 601. However, it is not necessary to be limited to this. Instead, for the same purpose, for example, MS data may be used, that is, an ID card such a magnetic card may be used.

Figure 19:
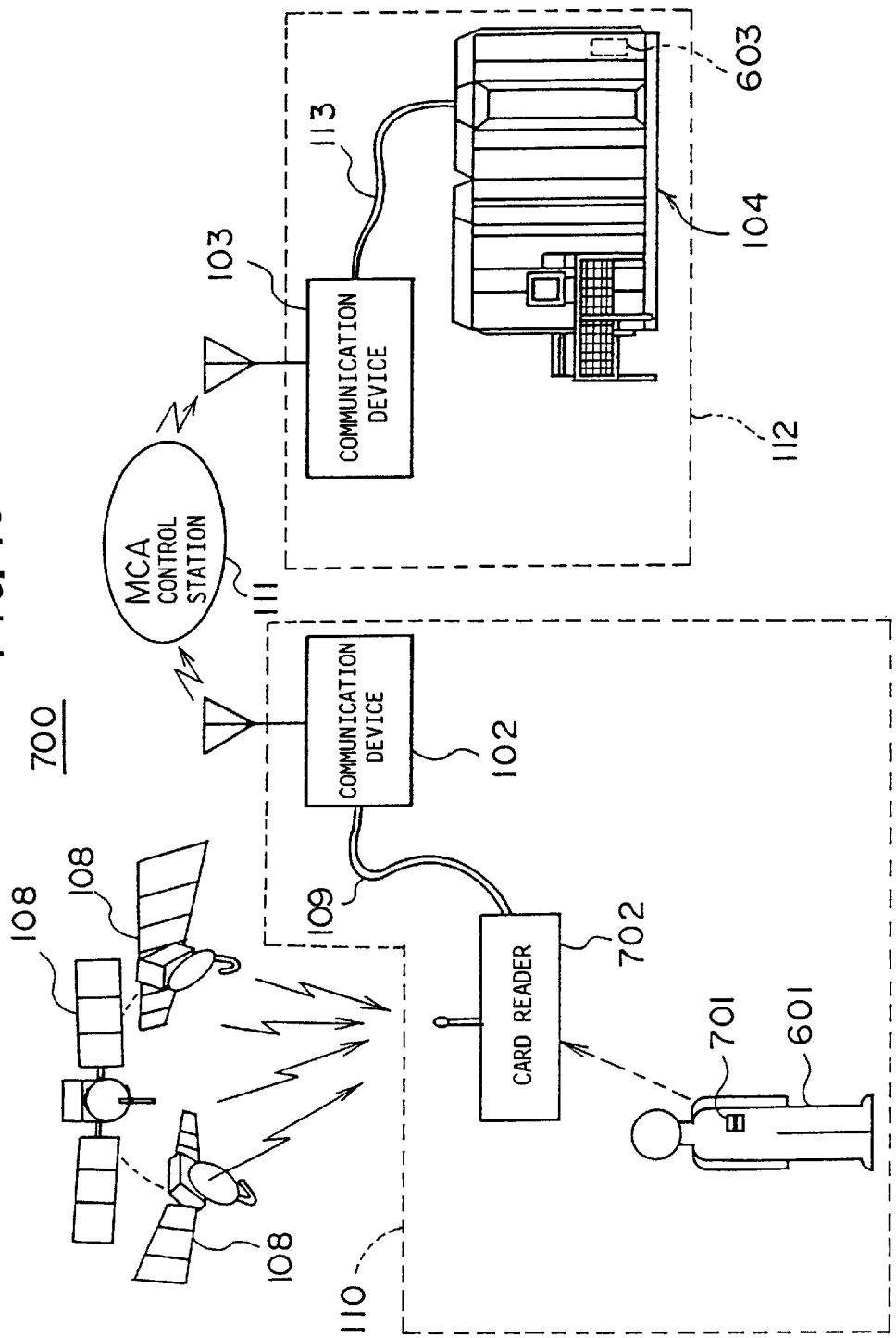
FIG. 19 shows a general arrangement of a seventh embodiment of the present invention.

FIG. 19 shows a general arrangement of a seventh embodiment of the present invention. In the figure, to the equipment/objects the same as those of FIG. 18, the same reference numerals are given and the descriptions thereof will be omitted.

In a transportation management system 700 in the seventh embodiment, a magnetic card 701 is distributed to each person for collection and delivery 601, an ID for identifying a particular person for collection and delivery 601 being previously written in the magnetic card 701. Further, a card reader 702 is used as a portable terminal device instead of the bar code reader 101.

Figure 20:
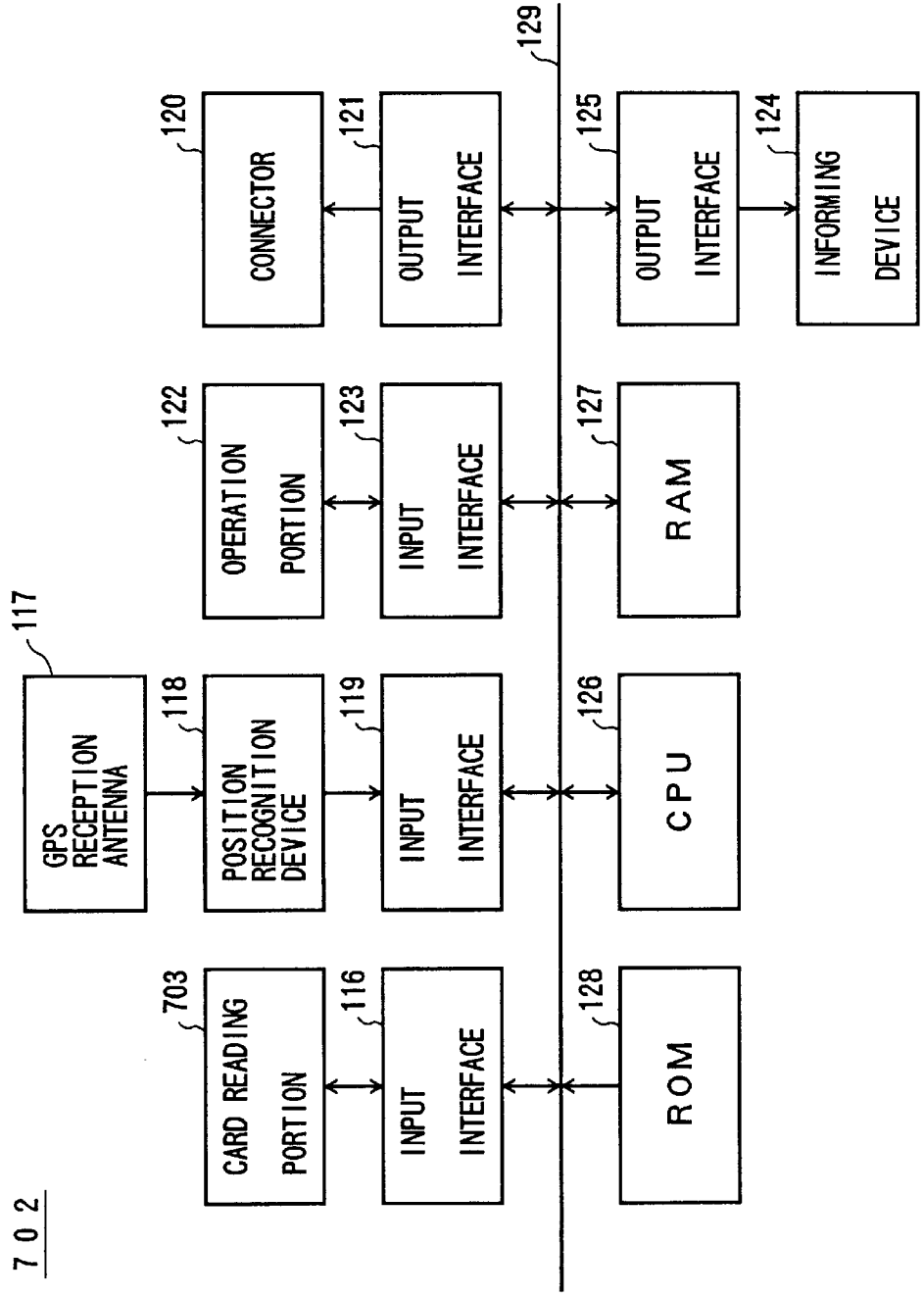
FIG. 20 shows a block diagram of a card reader in the seventh embodiment of the present invention.

FIG. 20 shows a block diagram of the card reader 702 in the seventh embodiment of the present invention. In the figure, to the blocks the same as those of FIG. 3, the same reference numerals are given and the descriptions thereof will be omitted.

In the card reader 702 in the seventh embodiment, instead of the bar code reading portion 115, a card reading portion 703 is provided. The card reading portion 703 magnetically reads the ID magnetically recorded in the magnetic card 701.

Further, as a method for identifying a particular person, other than use of a bar code or a magnetic card, use of speech recognition or fingerprint recognition can be considered.

Figure 21:
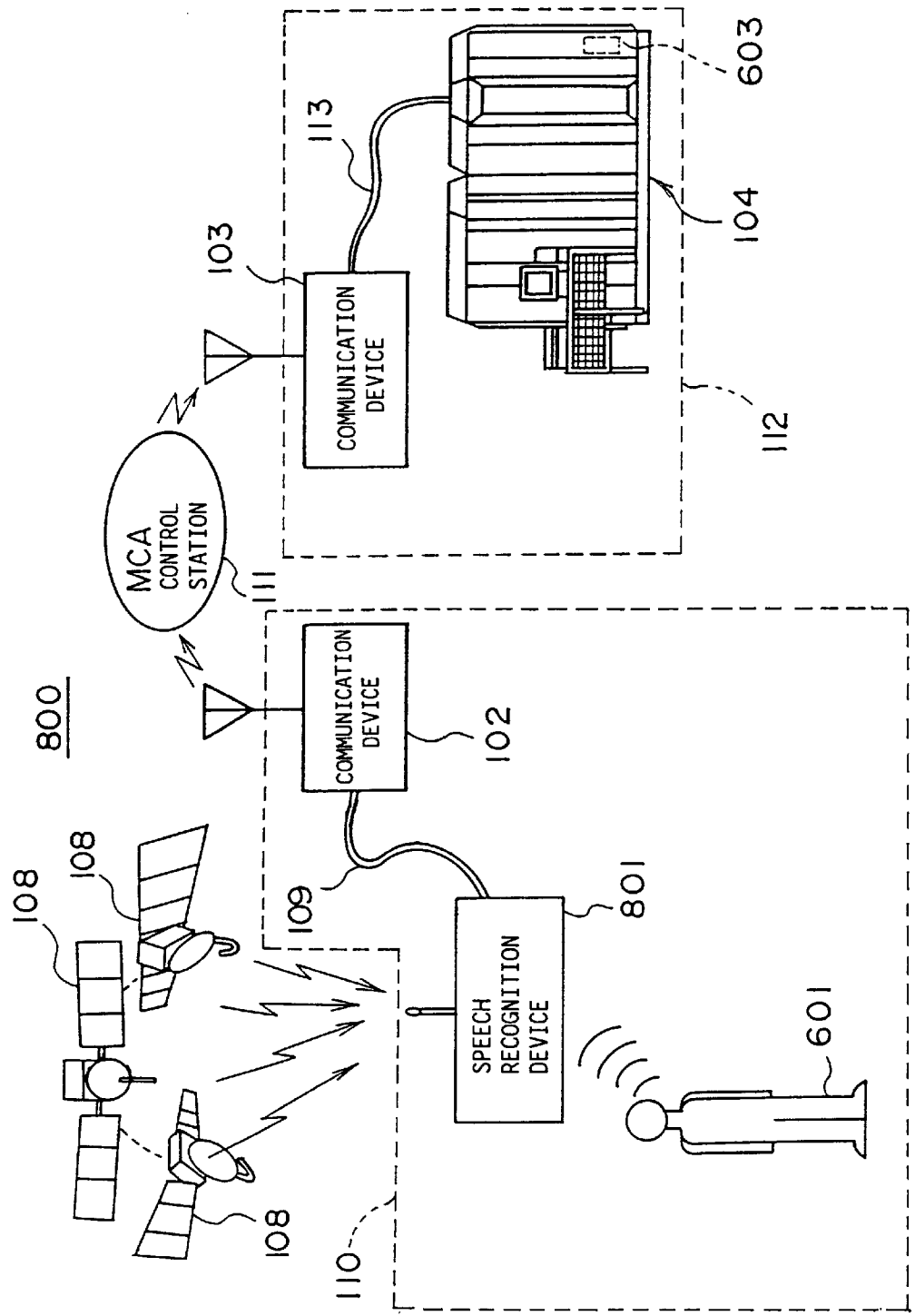
FIG. 21 shows a general arrangement of an eighth embodiment of the present invention.

FIG. 21 shows a general arrangement of an eighth embodiment of the present invention. In the figure, to the equipments/things the same as those of FIG. 18, the same reference numerals are given and the descriptions thereof will be omitted.

In a transportation management system 800 in the eighth embodiment, a speech recognition device 801 is used as a portable terminal device instead of the bar code reader 101.

Figure 22:
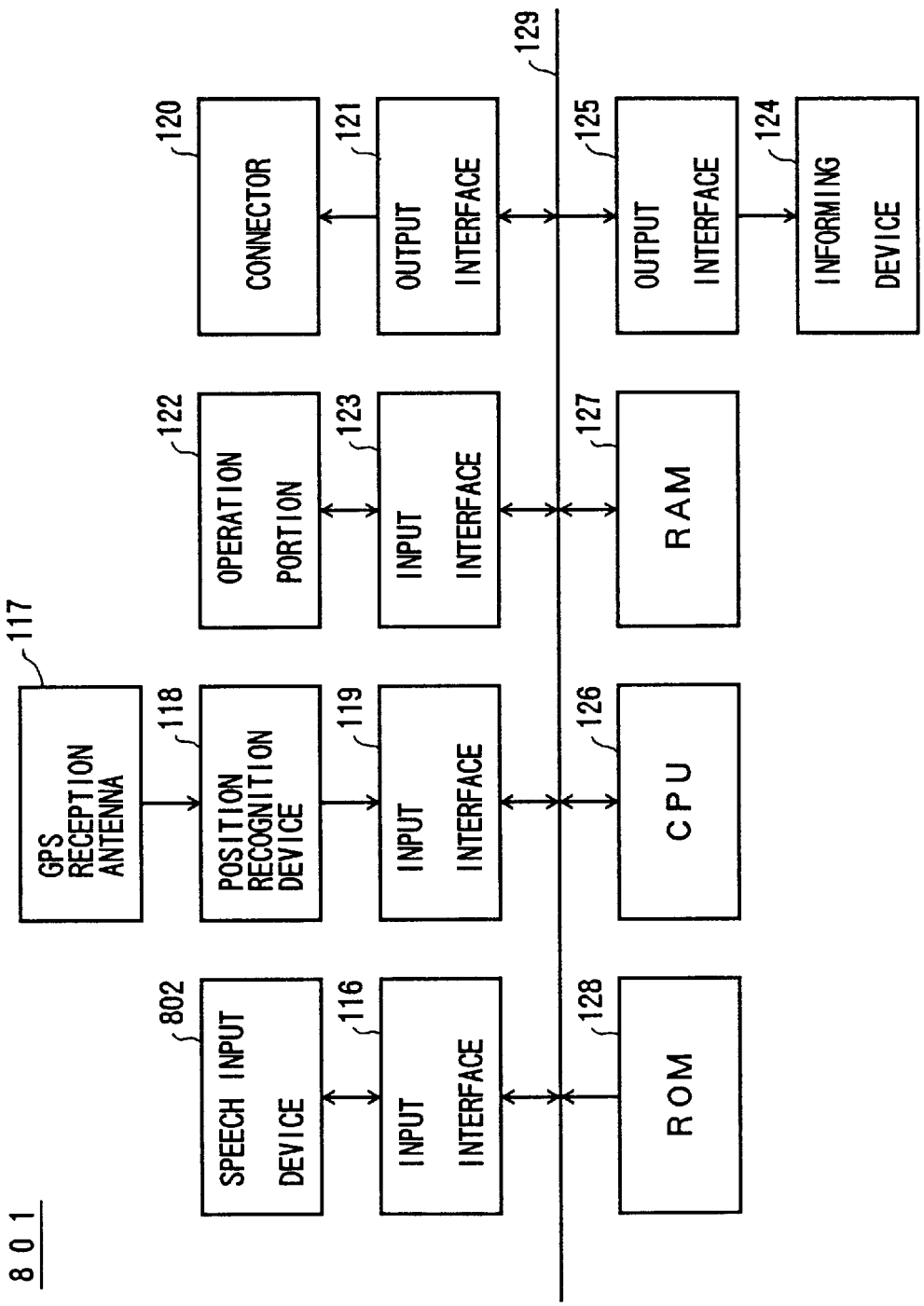
FIG. 22 shows a block diagram of a speech recognition device in the eighth embodiment of the present invention.

FIG. 22 shows a block diagram of the speech recognition device 801 in the eighth embodiment of the present invention. In the figure, to the blocks the same as those of FIG. 3, the same reference numerals are given and the descriptions thereof will be omitted.

The speech recognition device 801 in the eighth embodiment is provided with a speech input device 802 such as a microphone instead of the bar code reading portion 115. Frequency characteristics of voices and a speech recognition program are previously stored in the ROM 128. The speech recognition program is used for recognizing the ID given to each person for collection and delivery 601, by comparing the frequency characteristics of the voice of a particular person for collection and delivery 601 with those stored in the ROM 128. Thereby, the speech recognition device 801 identifies the ID, given to each person for collection and delivery 601, using his or her voice.

Figure 23:
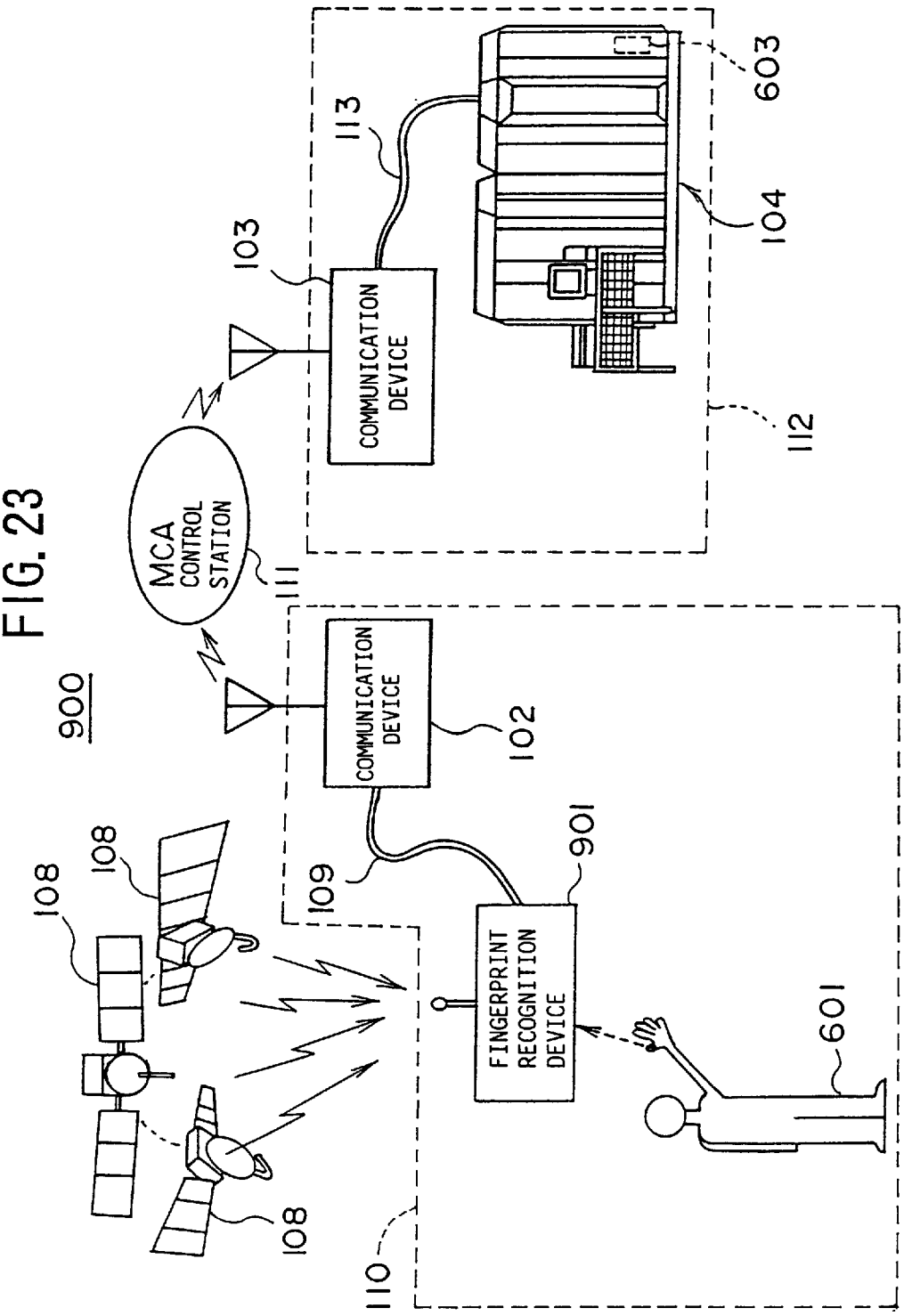
FIG. 23 shows a general arrangement of a ninth embodiment of the present invention.

FIG. 23 shows a general arrangement of an ninth embodiment of the present invention. In the figure, to the equipment/objects the same as those of FIG. 18, the same reference numerals are given and the descriptions thereof will be omitted.

In a transportation management system 900 in the ninth embodiment, a fingerprint recognition device 901 is used as a portable terminal device instead of the bar code reader 101.

Figure 24:
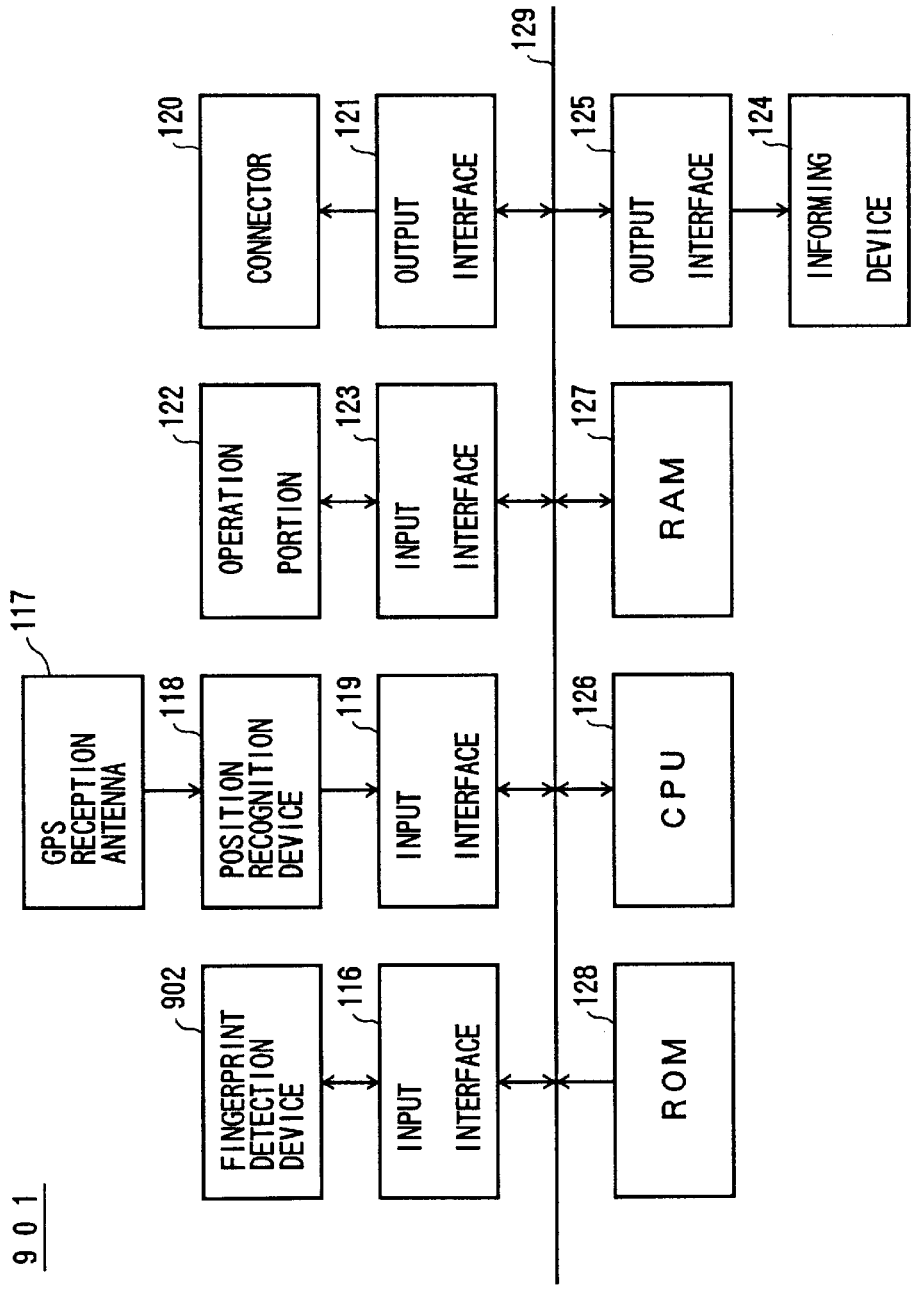
FIG. 24 shows a block diagram of a fingerprint recognition device in the ninth embodiment of the present invention.

FIG. 24 shows a block diagram of the fingerprint recognition device 901 in the ninth embodiment of the present invention. In the figure, to the blocks the same as those of FIG. 3, the same reference numerals are given and the descriptions thereof will be omitted.

The fingerprint recognition device 901 in the ninth embodiment is provided with a fingerprint detection device 902, which optically reads the fingerprint of a particular person for collection and delivery 601, instead of the bar code reading portion 115. Patterns of fingerprints and a finger print recognition program are previously stored in the ROM 128. The fingerprint recognition program is used for recognizing the ID, given to each person for collection and delivery 601, by comparing the fingerprint of a particular person for collection and delivery 601 with the patterns of fingerprints previously stored in the ROM 128. Thereby, the fingerprint recognition device 901 identifies the ID, given to each person for collection and delivery 601, using his or her fingerprint.

In each of the speech recognition in the eighth embodiment and the fingerprint recognition in the ninth embodiment, an error exists in the recognition. By combining these two methods, it is possible to recognize the ID, given to each person for collection and delivery 601, precisely.

Further, the MCA radio communication system with the separate communication device 102 is used as a method for communicating with the host computer 104 in each of the sixth through ninth embodiments. However, it is not necessary to be limited to this. Any of the communication methods used in the second through fifth embodiments can be used in each of the sixth through ninth embodiments instead of the MCA radio communication system with the separate communication device 102.

Further, the present invention is applied to the transportation management systems in the sixth through ninth embodiments. However, it is not necessary to be limited to this. The present invention can also be applied to a system for managing particular persons, to each of which an ID being given. For example, the present invention can be applied to a case where the position of each sales person is managed.

Further, the present invention is not limited to the above-described embodiments, and variations and modifications may be made without departing from the scope of the present invention.

What is claimed is:

1. A portable terminal apparatus, comprising: information collecting means for collecting information from a selected information source;

position detecting means for detecting a current position of said portable terminal apparatus at the time of collecting the information;

managing means for managing the information from the selected information source and the current position of said portable terminal apparatus to inform that the article is to be collected and/or delivered and to report the information;

radio communication means; and reporting means for reporting the information, the position, and the time via the radio communication means, wherein said information collecting means comprises:

speech recognizing means for recognizing voices, and information reading means for reading identification information from the voices recognized by said speech recognizing means, wherein a position of a user handling the portable terminal apparatus is detected by combining said detected current position and said recognized voices, and the position of the user is used for a staff management in an article delivery system.

2. The portable terminal apparatus, according to claim 1, wherein said information collecting means collects identification information of an operator.

3. The portable terminal apparatus, according to claim 1, wherein said information collecting means comprises a bar code reader.

4. The portable terminal apparatus, according to claim 1, wherein said position detecting means detects the current position via a GPS (Global Positioning System).

5. The portable terminal apparatus, according to claim 1, wherein said position detecting means receives position information and time information from nodes of a LAN (Local Area Network) and detects the current position.

6. The portable terminal apparatus, according to claim 1, further comprising transmitting means for transmitting the information from the selected information source and the current position of said portable terminal apparatus.

7. The portable terminal apparatus, according to claim 1, wherein said information collecting means comprises:

fingerprint recognizing means for recognizing fingerprints; and information reading means for reading identification information from a pattern of a fingerprint recognized by said fingerprint recognizing means.

8. The portable terminal apparatus as set forth in claim 1, further comprising:

time means for determining the time in which the information from the selected information source and the current position of the portable terminal device are received.

9. The portable terminal apparatus, according to claim 1, wherein said selected information source comprises a bar code.

10. The portable terminal apparatus, according to claim 1, wherein said portable terminal apparatus is used for distribution of articles.

11. A portable terminal unit, comprising:

an information collecting unit collecting information from selected information source;

a position detecting unit detecting a current position of said portable terminal unit at the time of collecting the information;

a radio communication unit;

a managing unit managing the information from the selected information source and the current position of said portable terminal unit;

an informing unit for informing that the article is to be collected and/or delivered; and a reporting unit for reporting the information, the current position, and the time via the radio communication unit, wherein said information collecting unit comprises:

speech recognizing unit to recognize voices, and an information reading unit to read identification information from the voice recognized by said speech recognizing unit, wherein a position of a user handling the portable terminal unit is detected by combining said detected current position and said recognized voices, and the position of the user is used for a staff management in an article delivery system.

12. The portable terminal unit, according to claim 11, wherein said information collecting unit collects identification information of an operator.

13. The portable terminal unit, according to claim 11, wherein said information collecting unit comprises a bar code reader.

14. The portable terminal unit, according to claim 11, wherein said position detecting unit detects the current position via a GPS (Global Positioning System).

15. The portable terminal unit, according to claim 11, wherein said position detecting unit receives position information and time information from nodes of a LAN (Local Area Network) and detects the current position.

16. The portable terminal unit, according to claim 11, further comprising a communication unit transmitting the information from the selected information source and the current position of said portable terminal unit.

17. The portable terminal unit, according to claim 11, wherein said information collecting unit comprises:

a speech recognition unit recognizing voices; and an information reading unit reading identification information from a voice recognized by said speech recognition unit.

18. The portable terminal unit, according to claim 11, wherein said information collecting unit comprises:

a fingerprint recognition unit recognizing fingerprints; and an information reading unit reading identification information from a pattern of a fingerprint recognized by said fingerprint recognition unit.

19. The portable terminal unit as set forth in claim 10, further comprising:

a time unit determining the time in which the information from the selected information source and the current position of the portable terminal device are detected.

20. The portable terminal unit, according to claim 11, wherein said selected information source comprises a bar code.

21. The portable terminal unit, according to claim 11, wherein said portable terminal unit is used for distribution of articles.

22. An information management system, comprising:

portable terminal means, comprising information collecting means for collecting information from a selected information source, position detecting means for detecting a current position of said portable terminal means at the time of collecting the information, managing means for managing the information from the selected information source and the current position of said portable terminal means and outputting a signal indicative thereof, and transmitting means for transmitting the signal;

receiving means for receiving the signal;

radio communication means;

managing means for managing distribution of an article using the signal;

informing means for informing that the article is to be collected and/or delivered; and reporting means for reporting the information, the current position, and the time via the radio communication means, and deleting the information, the current position, and the time, wherein said information collecting means comprises:

speech recognizing means for recognizing voices, and information reading means for reading identification information from the voices recognized by said speech recognizing means, wherein a position of a user handling the portable terminal means is detected by combining said detected current position and said recognized voices, and the position of the user is used for a staff management in a system to deliver said article.

23. The information management system, according to claim 22, wherein said portable terminal means is used for distribution of articles.

24. The information management system, according to claim 22, wherein said information collecting means comprises a bar code reader.

25. An information management system, comprising:

a portable terminal unit, comprising an information collecting unit collecting information from a selected information source, a position detecting unit detecting the current position of said portable terminal unit at the time of collecting the information, and a managing unit managing the information from the selected information source and the current position of said portable terminal unit and outputting a signal indicative thereof, and a transmitter transmitting the signal;

a receiver receiving the signal;

a radio communication unit;

a managing unit managing the distribution of an article using the signal;

an informing unit informing that the article is to be collected and/or delivered; and a reporting unit reporting the information, the current position, and the time via the radio communication unit, and deleting the information, the current position, and the time, wherein said information collecting unit comprises:

a speech recognizing unit to recognize voices, and an information reading unit to read identification information from the voice recognized by said speech recognizing unit, wherein a position of a user handling the portable terminal unit is detected by combining said detected current position and said recognized voices, and the position of the user is used for a staff management in a system to deliver said article.

26. The information management system, according to claim 25, wherein said portable terminal unit is used for distribution of articles.

27. The information management system, according to claim 25, wherein said information collecting unit comprises a bar code reader.

28. An information management method, comprising:

collecting information using a portable unit from a selected information source, detecting a current position of the portable unit at a time of collecting the information, managing the information from the selected information source and the current position of the portable unit and outputting a signal indicative thereof, and transmitting the signal;

receiving the signal;

managing distribution of an article using the signal;

informing that the article is to be collected and/or delivered;

reporting the information, the current position, and the time; and deleting the information, the current position, and the time, wherein said collecting of information comprises:

recognizing voices, and reading identification information from the recognized voices, wherein a position of a user handling the portable unit is detected by combining said detected current position and said recognized voices, and the position of the user is used for a staff management in a system to deliver said article.

29. The information management method, according to claim 28, further comprising:

determining the time in which the information from the selected information source and the current position of the portable unit are detected.

30. The information management method, according to claim 28, further comprising using said portable unit for distribution of articles.

31. A portable terminal apparatus, comprising:

reading means for reading information from a bar code;

position detecting means for detecting a current position of said portable terminal apparatus at the time of reading the information;

transmitter means for transmitting the information from the bar code and the current position of said portable terminal apparatus;

radio communication means;

managing means managing the information from the bar code and the current position of said portable terminal apparatus;

informing means for informing that an article is to be collected and/or delivered; and reporting means for reporting the information, the current position, and the time via the radio communication means, and deleting the information, the current position, and the time, wherein said reading means comprises:

bar code reading means for reading the information from the bar code;

speech recognizing means for recognizing voices, and information reading means for reading identification information from the voices recognized by said speech recognizing means, wherein a position of a user handling the portable terminal apparatus is detected by combining said detected current position and said recognized voices, and the position of the user is used for a staff management in a system to deliver said article.

32. The portable terminal apparatus, according to claim 31, wherein said portable terminal apparatus is used for distribution of articles.

33. A portable terminal unit, comprising:
a reading unit reading information from a bar code;
a position detecting unit detecting a current position of said portable terminal unit at the time of reading the information;
a transmitter unit transmitting the information from the bar code and the current position of said portable terminal unit;
a radio communication unit;
a managing unit managing the information from the bar code and the current position of said portable terminal unit;
an informing unit informing that an article is to be collected and/or delivered; and
a reporting unit reporting the information, the current position, and the time via the radio communication unit, and deleting the information, the current position, and the time, wherein said reading unit comprises:
a bar code reading unit to read the information from the bar code;
a speech recognizing unit to recognize voices, and
an information reading unit to read identification information from the voices recognized by said speech recognizing unit,
wherein a position of a user handling the portable terminal unit is detected by combining said detected current position and said recognized voices, and the position of the user is used for a staff management in a system to deliver the article.

34. The portable terminal unit, according to claim 33, wherein said portable terminal unit is used for distribution of articles.

35. A portable terminal apparatus, comprising:
an information collecting unit to collect information from a selected information source; and
a position detecting unit to detect a current position of said portable terminal apparatus at the time of collecting the information,
wherein said information collecting unit comprises:
speech recognizing unit to recognize voices, and
an information reading unit to read identification information from the voices recognized by said speech recognizing unit,
wherein a position of a user handling the portable terminal apparatus is detected by combining said detected current position and said recognized voices, and the position of the user is used for a staff management in an article delivery system.

36. A portable terminal apparatus, comprising:
an information collecting unit to collect information from an information source, the information collecting unit comprising:
a speech recognizing unit to recognize a voice, and
an information reading unit to read identification information from the voice recognized by said speech recognizing unit;
a position detecting unit to detect a position of said portable terminal apparatus; and
a radio communication unit to report the detected position,
wherein a position of a user handling the portable terminal apparatus is detected by combining said detected position and said recognized voices, and the position of the user is used for a staff management in an article delivery system.

37. A portable terminal apparatus, comprising:
an information collecting unit to collect information from an information source, the information collecting unit comprising:
a fingerprint recognizing unit to recognize a fingerprint, and
an information reading unit to read identification information from a pattern of the recognized fingerprint;
a position detecting unit to detect a position of said portable terminal apparatus; and
a radio communication unit to report the detected position,
wherein a position of a user handling the portable terminal apparatus is detected by combining said detected position and said recognized fingerprint, and the position of the user is used for a staff management in an article delivery system.

* * * * *